US012484000B2

(12) United States Patent
Sun et al.

(10) Patent No.: US 12,484,000 B2
(45) Date of Patent: Nov. 25, 2025

(54) INITIAL PHYSICAL RANDOM ACCESS CHANNEL (PRACH) POWER CONTROL USING MULTIPLE PRACH SIGNALS

(71) Applicant: QUALCOMM Incorporated, San Diego, CA (US)

(72) Inventors: Jing Sun, San Diego, CA (US); Xiaoxia Zhang, San Diego, CA (US); Jing Jiang, San Diego, CA (US); Junyi Li, Fairless Hills, PA (US); Raviteja Patchava, San Diego, CA (US); Vamsi Krishna Amalladinne, Fullerton, CA (US)

(73) Assignee: QUALCOMM Incorporated, San Diego, CA (US)

( * ) Notice: Subject to any disclaimer, the term of this patent is extended or adjusted under 35 U.S.C. 154(b) by 331 days.

(21) Appl. No.: 18/366,457

(22) Filed: Aug. 7, 2023

(65) Prior Publication Data

US 2025/0056431 A1 Feb. 13, 2025

(51) Int. Cl.
*H04W 52/50* (2009.01)
*H04W 52/24* (2009.01)
*H04W 72/0446* (2023.01)
*H04W 74/00* (2009.01)
*H04W 74/0833* (2024.01)

(52) U.S. Cl.
CPC ......... *H04W 52/50* (2013.01); *H04W 52/242* (2013.01); *H04W 72/0446* (2013.01); *H04W 74/002* (2013.01); *H04W 74/0833* (2013.01)

(58) Field of Classification Search
CPC ............... H04W 52/50; H04W 52/242; H04W 72/0446; H04W 74/002; H04W 74/0833; H04W 52/146; H04W 52/325
See application file for complete search history.

(56) References Cited

U.S. PATENT DOCUMENTS

2021/0105820 A1* 4/2021 Kim ................. H04B 7/0626

FOREIGN PATENT DOCUMENTS

WO WO-2022126302 A1 6/2022

OTHER PUBLICATIONS

International Search Report and Written Opinion—PCT/US2024/037172—ISA/EPO—Oct. 28, 2024.

* cited by examiner

*Primary Examiner* — Ankur Jain
(74) *Attorney, Agent, or Firm* — Kevin M. Donnelly; Norton Rose Fulbright US LLP

(57) ABSTRACT

This disclosure provides systems, methods, and apparatuses, including computer programs encoded on computer storage media, for wireless communication. Various aspects relate to initial physical random access channel (PRACH) power control using multiple PRACH signals, and more particularly to supporting one or more initialization and power control operations between a user equipment (UE) and a network entity prior to an association process. The initial PRACH power control may include the UE transmitting, to the network entity, a first set of PRACH signals at different respective power levels. The network entity may transmit a response message indicating a single set of PRACH signals detected by the network entity, and the UE may detect whether a first PRACH signal, of the first set of PRACH signals, is included in the single set of PRACH signals to select a power level associated with the first PRACH signal for transmitting association messages.

30 Claims, 9 Drawing Sheets

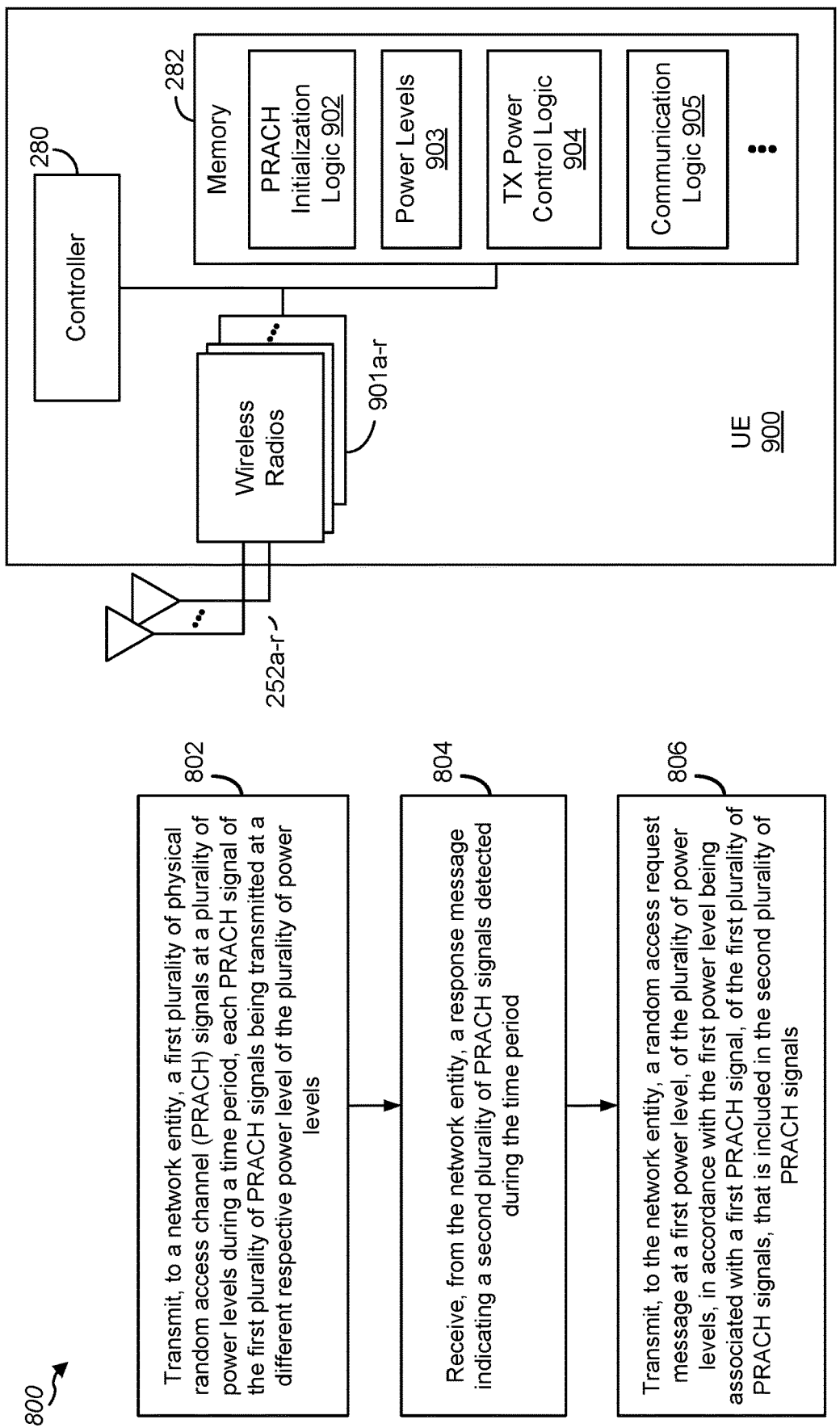

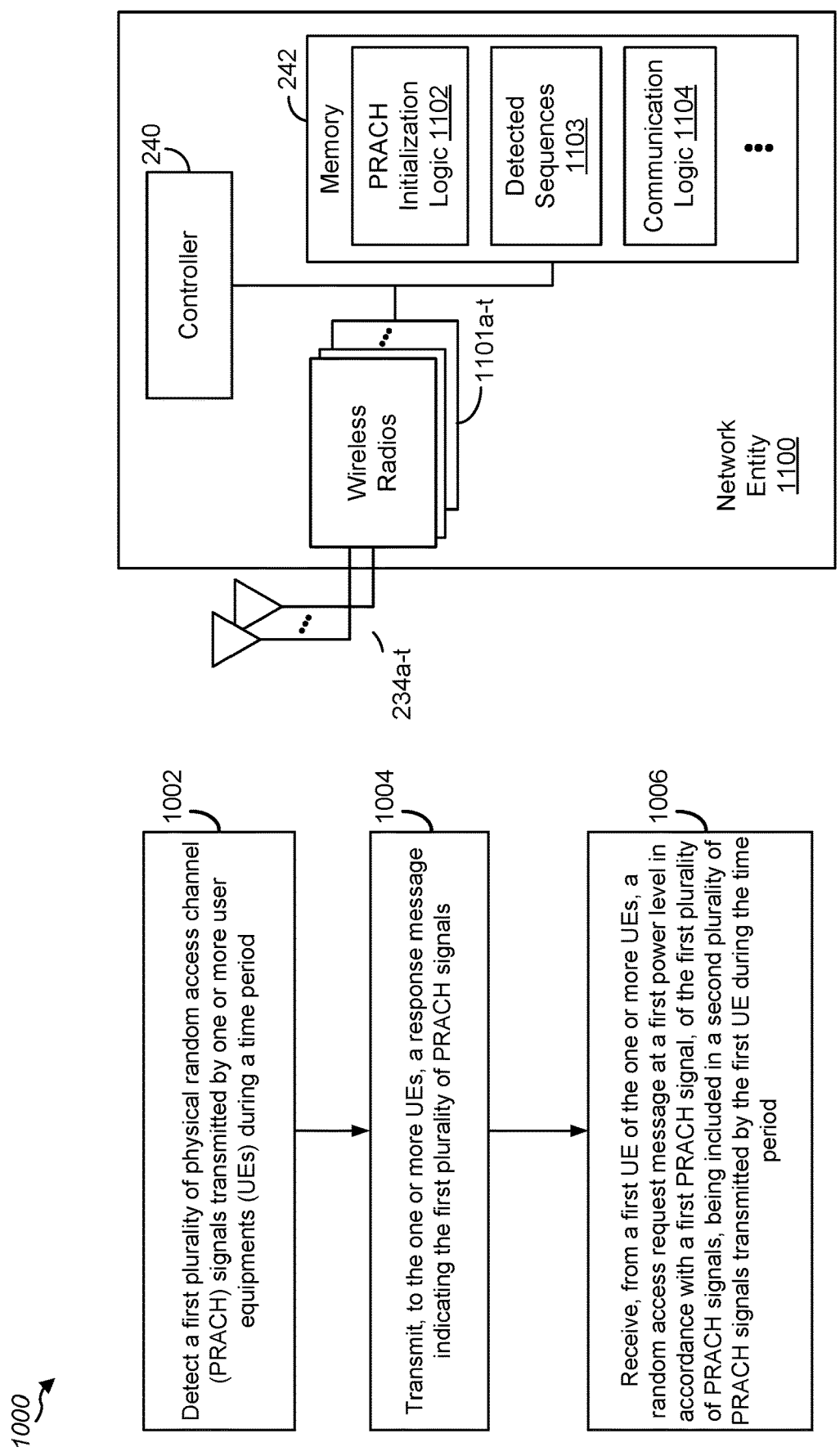

INITIAL PHYSICAL RANDOM ACCESS CHANNEL (PRACH) POWER CONTROL USING MULTIPLE PRACH SIGNALS

TECHNICAL FIELD

This disclosure relates generally to wireless communication, and more specifically, to initial physical random access channel (PRACH) power control using multiple PRACH signals.

DESCRIPTION OF THE RELATED TECHNOLOGY

Wireless communications systems are widely deployed to provide various types of communication content such as voice, video, packet data, messaging, broadcast, and so on. A wireless multiple-access communications system may include a number of base stations or network access nodes, each simultaneously supporting communication for multiple communication devices, which may be otherwise known as user equipment (UE). These systems may be capable of supporting communication with multiple UEs by sharing the available system resources (such as time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

To perform communications within a wireless network, a UE performs an association process with a nearby network entity, such as a base station, that provides a connection to the wireless network. To initiate the association process, the UE may transmit physical random access channel (PRACH) signaling to the network entity and exchange information with the network entity for use in establishing a communication link between the devices. In order for the PRACH signaling to be received by the network entity, a detected power level of the PRACH signaling at the network entity must satisfy a threshold level. However, due to path loss in the uplink (UL) direction between the UE and the network entity, a power level used to transmit the PRACH signaling by the UE may not be the same as the detected power level at the network entity. The UL path loss may be compensated for by the UE if the UE has information regarding the UL channel from the network entity. However, when the UE first attempts to communicate with the network entity to perform the association process, the UE may have only received a downlink (DL) signal from the network entity. Although the UE may be able to use a detected power level of the received DL signal to determine a DL path loss, at this time the UE has no information regarding the UL path loss for use in setting a power level to transmit the PRACH signaling.

To determine an initial power level for transmitting PRACH signaling (e.g., UL signaling), a UE typically performs open loop power control. Using such open loop power control, the UE determines the DL path loss and selects an initial UL power level based on the DL path loss, and in some examples, optionally one or more other parameters. Such open loop power control is based on the assumption that the DL path loss and the UL path loss are approximately the same. Such reciprocity is generally assumed for communications in a Time Division Duplex (TDD) band (in which the DL and UL channels are assumed to be reciprocal) and may also be assumed for communications in the Frequency Division Duplex (FDD) band (in which the DL and UL channels are relatively close in frequency). Open loop power control enables the UE to select an initial transmit (TX) power level such that the PRACH signaling is received at the network entity at or above a target power level. However, if the DL and UL channels are not sufficiently similar, the DL path loss may not be indicative of the UL path loss, which may result in the UE selecting an initial TX power level that is insufficient to meet the target power level at the network entity.

Such a scenario is more likely when using multiple component carriers, such as when using a supplemental uplink (SUL) carrier configured in a lower frequency band to supplement one or more DL and/or UL carriers in a higher frequency band, because the DL path loss determined based on received higher frequency band signaling may not be sufficiently similar to the UL path loss for lower frequency band signaling. As another example, if a UE receives DL signaling from a first transmit/receive point (TRP) and transmits UL signaling to a different TRP, the DL path loss determined based on the DL signaling received from the first TRP may not be correlated with the UL path loss for transmitting signaling to the second TRP. Additionally, research is currently underway for providing flexible duplex communications in a future generation of wireless communication systems in which high band DL channels will be paired with low band UL channels, and thus be associated with some level of inaccuracy in determining initial TX power levels. If the network entity is unable to detect the PRACH signaling due to insufficient TX power at the UE, the UE must wait until the end of a monitoring period for a response from the network entity before retransmitting the PRACH signaling at a higher power level. This process is repeated until the network entity is able to detect the PRACH signaling. Thus, inaccurate initial TX power level selection by a UE can significantly increase the duration of an association process with a network entity, thereby increasing power consumption at the UE and increasing an initial delay.

SUMMARY

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later. The systems, methods and devices of this disclosure each have several innovative aspects, no single one of which is solely responsible for the desirable attributes disclosed herein.

One innovative aspect of the subject matter described in this disclosure can be implemented in a user equipment (UE). The UE includes a processing system that includes processor circuitry and memory circuitry that stores code. The processing system configured to cause the UE to transmit, to a network entity, a first plurality of physical random access channel (PRACH) signals at a plurality of power levels during a time period. Each PRACH signal of the first plurality of PRACH signals is transmitted at a different respective power level of the plurality of power levels. The processing system is also configured to cause the UE to receive, from the network entity, a response message indicating a second plurality of PRACH signals detected during the time period. The processing system is further configured to cause the UE to transmit, to the network entity, a random access request message at a first power level, of the plurality of power levels, in accordance with the first power level being associated with a first PRACH signal, of the first plurality of PRACH signals, that is included in the second plurality of PRACH signals.

Another innovative aspect of the subject matter described in this disclosure can be implemented in a method for wireless communication performed by a UE. The method includes transmitting, to a network entity, a first plurality of PRACH signals at a plurality of power levels during a time period. Each PRACH signal of the first plurality of PRACH signals is transmitted at a different respective power level of the plurality of power levels. The method also includes receiving, from the network entity, a response message indicating a second plurality of PRACH signals detected during the time period. The method further includes transmitting, to the network entity, a random access request message at a first power level, of the plurality of power levels, in accordance with the first power level being associated with a first PRACH signal, of the first plurality of PRACH signals, that is included in the second plurality of PRACH signals.

Another innovative aspect of the subject matter described in this disclosure can be implemented in a network entity. The network entity includes a processing system that includes processor circuitry and memory circuitry that stores code. The processing system configured to cause the network entity to detect a first plurality of PRACH signals transmitted by one or more UEs during a time period. The processing system is also configured to cause the network entity to transmit, to the one or more UEs, a response message indicating the first plurality of PRACH signals. The processing system is further configured to cause the network entity to receive, from a first UE of the one or more UEs, a random access request message at a first power level in accordance with a first PRACH signal, of the first plurality of PRACH signals, being included in a second plurality of PRACH signals transmitted by the first UE during the time period.

Another innovative aspect of the subject matter described in this disclosure can be implemented in a method for wireless communication performed by a network entity. The method includes detecting a first plurality of PRACH signals transmitted by one or more UEs during a time period. The method also includes transmitting, to the one or more UEs, a response message indicating the first plurality of PRACH signals. The method further includes receiving, from a first UE of the one or more UEs, a random access request message at a first power level in accordance with a first PRACH signal, of the first plurality of PRACH signals, being included in a second plurality of PRACH signals transmitted by the first UE during the time period.

Other aspects, features, and implementations of the present disclosure will become apparent to a person having ordinary skill in the art, upon reviewing the following description of specific, example implementations of the present disclosure in conjunction with the accompanying figures. While features of the present disclosure may be described relative to particular implementations and figures below, all implementations of the present disclosure can include one or more of the advantageous features described herein. In other words, while one or more implementations may be described as having particular advantageous features, one or more of such features may also be used in accordance with the various implementations of the disclosure described herein. In similar fashion, while example implementations may be described below as device, system, or method implementations, such example implementations can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 8 is a flow diagram illustrating an example process performable by a UE that supports initial PRACH power control using multiple PRACH signals according to one or more aspects.

FIG. 9 is a block diagram of an example UE that supports initial PRACH power control using multiple PRACH signals according to one or more aspects.

FIG. 10 is a flow diagram illustrating an example process performable by a network entity that supports initial PRACH power control using multiple PRACH signals according to one or more aspects.

FIG. 11 is a block diagram of an example network entity that supports initial PRACH power control using multiple PRACH signals according to one or more aspects.

Like reference numbers and designations in the various drawings indicate like elements.

DETAILED DESCRIPTION

Figure 1:
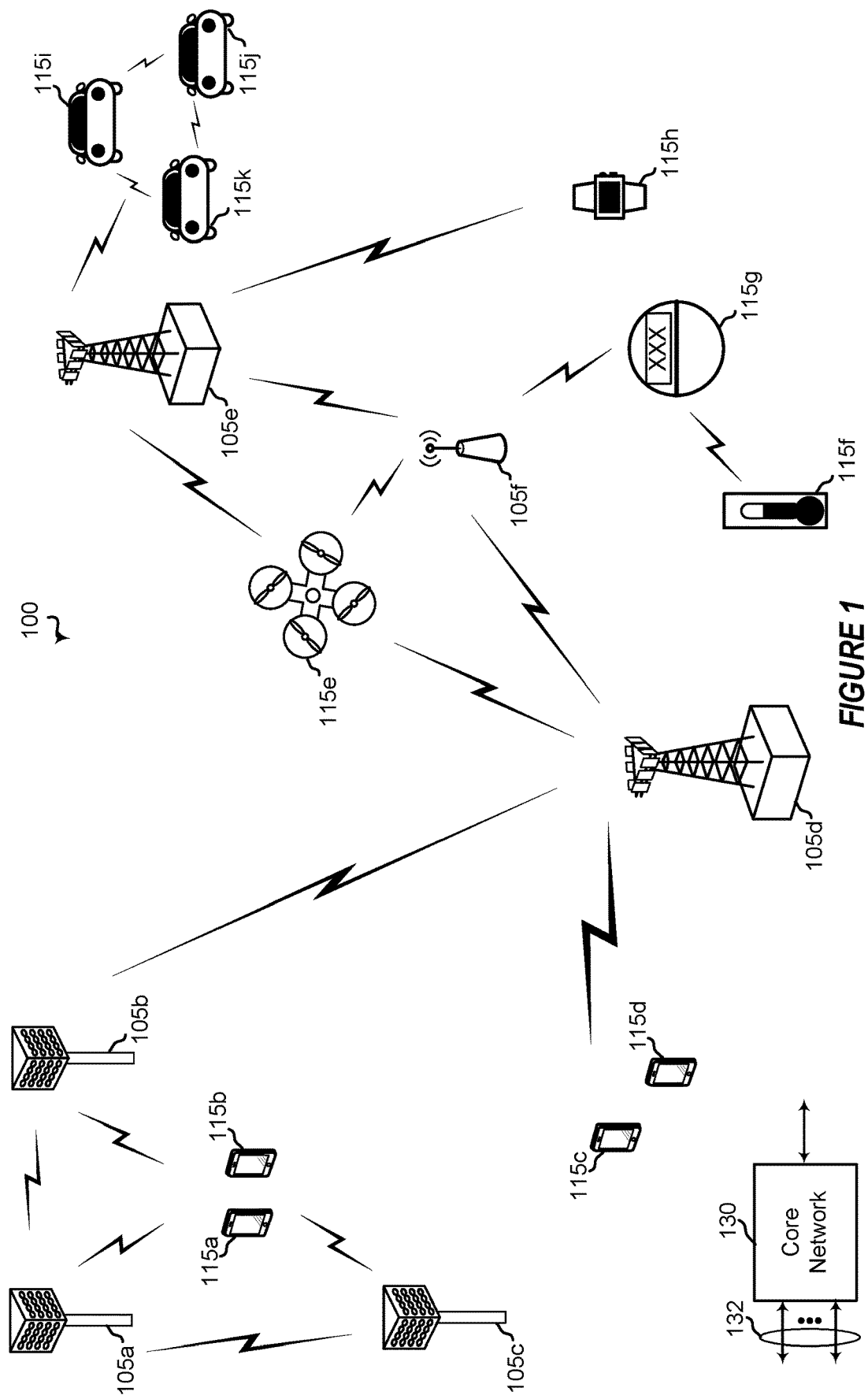
FIG. 1 is a block diagram illustrating details of an example wireless communication system according to one or more aspects.

Various aspects of the disclosure are described more fully hereinafter with reference to the accompanying drawings.

This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Various aspects relate generally to wireless communication, and more particularly, to initial physical random access channel (PRACH) power control using multiple PRACH signals. Some aspects more specifically relate to supporting one or more initialization and power control operations between a user equipment (UE) and a network entity prior to an association process. In some examples, each of one or more UEs may each transmit, to a network entity during a same or at least partially overlapping time period, a respective set of multiple PRACH signals at multiple different respective power levels. The network entity may monitor for PRACH signals during the time period and, after expiration of the time period, the network entity may send a response message to the one or more UEs that indicates a single set of PRACH signals that were detected by the network entity, in a best effort manner, during the time period. The single set of PRACH signals detected by the network entity may include zero, one, or more than one respective PRACH signal from each of the originally transmitted sets of multiple PRACH signals. The number of PRACH signals in the single set of PRACH signals may include fewer PRACH signals than the total number of originally transmitted PRACH signals as a result of one or more PRACH signals being transmitted at a power level that is too low to enable detection of the respective PRACH signal by the network entity, or due to interference by other PRACH signals transmitted by other UEs. As a non-limiting example, if a first UE transmitted a set of three PRACH signals, a second UE transmitted a set of two PRACH signals, and the network entity detected three PRACH signals of the five PRACH originally transmitted PRACH signals from both UEs, the network entity may transmit, to both UEs, a reply message that indicates each of the three detected PRACH signals. The response message may omit the remaining two originally transmitted PRACH signals that were not detected by the network entity. If a UE determines that at least one of the set of PRACH signals transmitted by the UE is included in the single set of PRACH signals indicated in the response message, the UE may use a lowest power level associated with the at least one PRACH signal as a power level for transmissions to be performed during the association process with the network entity. For example, the UE may use this power level to transmit a random access request (RAR) message (a "msg1" or a "msgA") as part of a 4-step or 2-step association process with the network entity.

Particular implementations of the subject matter described in this disclosure can be implemented to realize one or more of the following potential advantages. In some aspects, the present disclosure supports a process for a UE to perform initialization and power control using multiple PRACH signals prior to performing other steps of an association process with a network entity. The initialization and power control using multiple PRACH signals may enable the UE to determine a power level for transmitting messages as part of the association process that is more likely to be detectable than using an open loop power control, particularly if the downlink (DL) and uplink (UL) channels are not sufficiently similar in frequency. In some examples, because a UE transmits a set of multiple PRACH signals at different respective power levels, the network entity is more likely to detect at least one of the originally transmitted PRACH signals, which may be indicated by the network entity including the detected PRACH signal or signals in the response message. Such increased chance of detection by the network entity increases the chances that the UE can determine an appropriate power level after receiving a single response message, instead of performing multiple cycles of transmitting a respective PRACH signal and receiving a respective response message. Although such a sequential process may not take long if the DL path loss is sufficiently representative of the UL path loss, if the DL and UL channels are sufficiently separated in frequency, an initial power level selected to compensate for the DL path loss may not compensate for the UL path loss, and thus the UE may perform several iterations of transmitting respective PRACH signals and monitoring for respective response messages. Additionally, if the UE identifies that multiple PRACH signals of the set of originally transmitted PRACH signals are detected by the network entity, the UE may use a lowest power level associated with the identified PRACH signals to avoid using more power than needed to achieve a target power level at the network entity. As such, the techniques described herein may provide for more efficient, in terms of speed and network congestion, initialization and power control for UL transmissions by a UE for disparate-frequency DL and UL channels as compared to other techniques.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks, systems, or devices), as well as other communications networks. As described herein, the terms "networks" and "systems" may be used interchangeably. In some implementations, two or more wireless communications systems, also referred to as wireless communications networks, may be configured to provide or participate in authorized shared access between the two or more wireless communications systems.

A CDMA network may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may implement a radio technology such as Global System for Mobile Communications (GSM). 3GPP defines standards for the GSM EDGE (enhanced data rates for GSM evolution) radio access network (RAN), also denoted as GERAN. GERAN is the radio component of GSM or GSM EDGE, together with the network that joins the base stations (for example, the Ater and Abis interfaces, among other examples) and the base station controllers (for example, A interfaces, among other examples). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may include one or more GERANs, which may be coupled with UTRANs in the case of a UMTS or GSM network. Additionally, an operator network may include one or more LTE networks, or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named the "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices. The present disclosure may describe certain aspects with reference to LTE, 4G, 5G, or NR technologies; however, the description is not intended to be limited to a specific technology or application, and one or more aspects described with reference to one technology may be understood to be applicable to another technology. Indeed, one or more aspects the present disclosure are related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (such as ~1M nodes per km2), ultra-low complexity (such as ~10s of bits per sec), ultra-low energy (such as ~10+ years of battery life), and deep coverage with the capability to reach challenging locations; (2) including mission-critical control with strong security to safeguard sensitive personal, financial, or classified information, ultra-high reliability (such as ~99.9999% reliability), ultra-low latency (such as ~1 millisecond (ms)), and users with wide ranges of mobility or lack thereof; and (3) with enhanced mobile broadband including extreme high capacity (such as ~10 Tbps per km2), extreme data rates (such as multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) or frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHZ FDD or TDD implementations, subcarrier spacing may occur with 15 kHz, for example over 1, 5, 10, 20 MHz, and the like bandwidth. For other various outdoor and small cell coverage deployments of TDD greater than 3 GHZ, subcarrier spacing may occur with 30 kHz over 80 or 100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QOS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

FIG. 1 is a block diagram illustrating details of an example wireless communication system. The wireless communication system may include wireless network 100. The wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements, such as device-to-device, peer-to-peer or ad hoc network arrangements, among other examples.

The wireless network 100 illustrated in FIG. 1 includes a number of base stations 105 and other network entities. A base station may be a station that communicates with the UEs and may be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station or a base station subsystem serving the coverage area, depending on the context in which the term is used. In implementations of the wireless network 100 herein, the base stations 105 may be associated with a same operator or different operators, such as the wireless network 100 may include a plurality of operator wireless networks. Additionally, in implementations of the wireless network 100 herein, the base stations 105 may provide wireless communications using one or more of the same frequencies, such as one or more frequency bands in licensed spectrum, unlicensed spectrum, or a combination thereof, as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area, such as several kilometers in radius, and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area, such as a home, and, in addition to unrestricted access, may provide restricted access by UEs having an association with the femto cell, such as UEs in a closed subscriber group (CSG), UEs for users in the home, and the like. A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple cells, such as two cells, three cells, four cells, and the like.

The wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

The UEs 115 are dispersed throughout the wireless network 100, and each UE may be stationary or mobile. It should be appreciated that, although a mobile apparatus is commonly referred to as user equipment (UE) in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may include implementations of one or more of the UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, a gesture tracking device, a medical device, a digital audio player (such as MP3 player), a camera or a game console, among other examples; and digital home or smart home devices such as a home audio, video, and multimedia device, an appliance, a sensor, a vending machine, intelligent lighting, a home security system, or a smart meter, among other examples. In one aspect, a UE may be a device that includes a Universal Integrated Circuit Card (UICC). In another aspect, a UE may be a device that does not include a UICC. In some aspects, UEs that do not include UICCs may be referred to as IoE devices. The UEs 115a-115d of the implementation illustrated in FIG. 1 are examples of mobile smart phone-type devices accessing the wireless network 100. A UE may be a machine specifically configured for connected communication, including machine type communication (MTC), enhanced MTC (cMTC), narrowband IoT (NB-IoT) and the like. The UEs 115e-115k illustrated in FIG. 1 are examples of various machines configured for communication that access 5G network 100.

A mobile apparatus, such as the UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. Backhaul communication between base stations of the wireless network 100 may occur using wired or wireless communication links.

In operation at the 5G network 100, the base stations 105a-105c serve the UEs 115a and 115b using 3D beamforming and coordinated spatial techniques, such as coordinated multipoint (CoMP) or multi-connectivity. Macro base station 105d performs backhaul communications with the base stations 105a-105c, as well as small cell, the base station 105f. Macro base station 105d also transmits multicast services which are subscribed to and received by the UEs 115c and 115d. Such multicast services may include mobile television or stream video, or may include other services for providing community information, such as weather emergencies or alerts, such as Amber alerts or gray alerts.

The wireless network 100 of implementations supports mission critical communications with ultra-reliable and redundant links for mission critical devices, such the UE 115c, which is a drone. Redundant communication links with the UE 115e include from the macro base stations 105d and 105e, as well as small cell base station 105f. Other machine type devices, such as UE 115f (thermometer), the UE 115g (smart meter), and the UE 115h (wearable device) may communicate through the wireless network 100 either directly with base stations, such as the small cell base station 105f, and the macro base station 105e, or in multi-hop configurations by communicating with another user device which relays its information to the network, such as the UE 115f communicating temperature measurement information to the smart meter, the UE 115g, which is then reported to the network through the small cell base station 105f. The 5G network 100 may provide additional network efficiency through dynamic, low-latency TDD or FDD communications, such as in a vehicle-to-vehicle (V2V) mesh network between the UEs 115i-115k communicating with the macro base station 105c.

Figure 2:
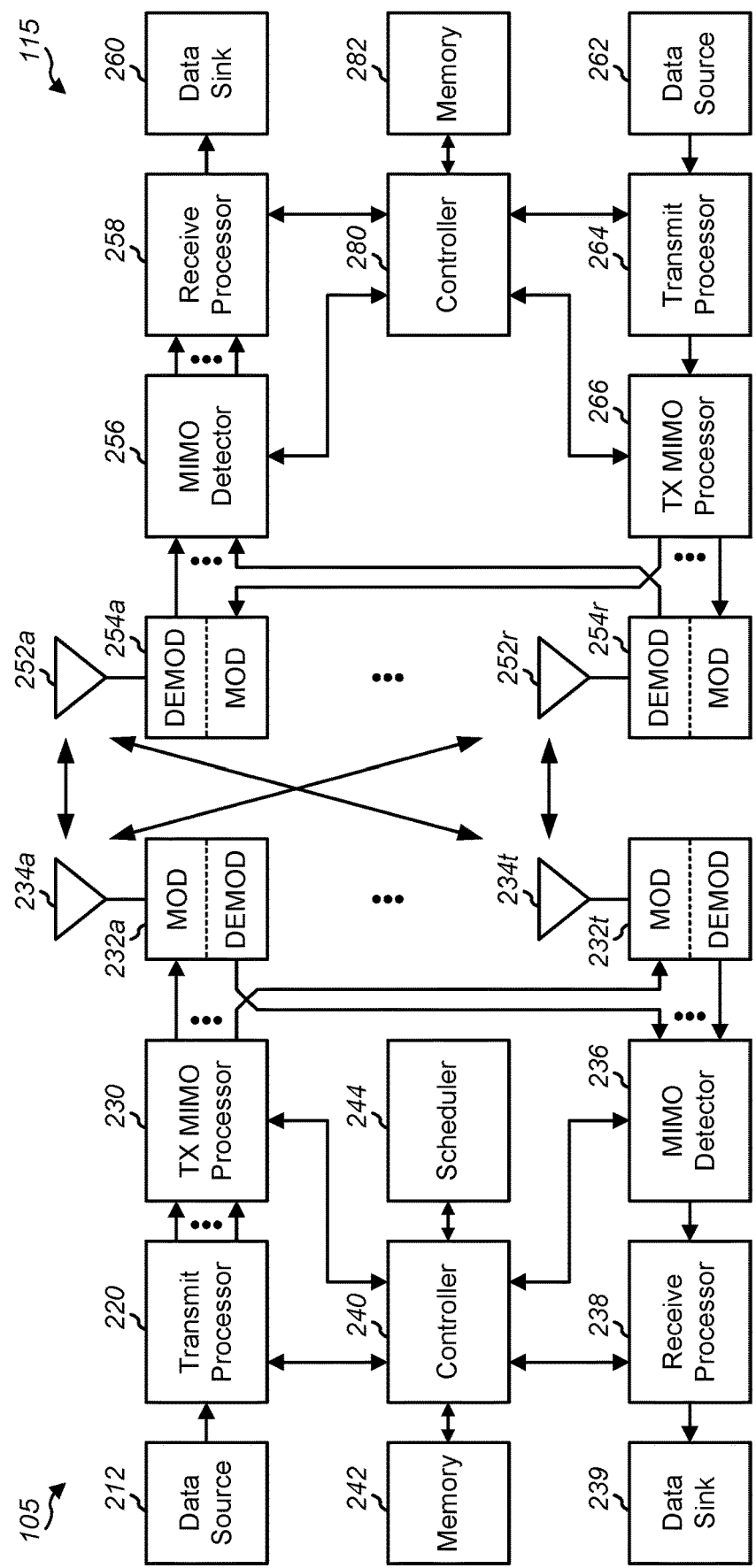
FIG. 2 is a block diagram illustrating examples of a base station and a user equipment (UE) according to one or more aspects.

FIG. 2 is a block diagram conceptually illustrating an example design of a base station 105 and a UE 115. The base station 105 and the UE 115 may be one of the base stations and one of the UEs in FIG. 1. For a restricted association scenario (as mentioned above), the base station 105 may be the small cell base station 105f in FIG. 1, and the UE 115 may be the UE 115c or 115d operating in a service area of the base station 105f, which in order to access the small cell base station 105f, would be included in a list of accessible UEs for the small cell base station 105f. Additionally, the base station 105 may be a base station of some other type. As shown in FIG. 2, the base station 105 may be equipped with antennas 234a through 234t, and the UE 115 may be equipped with antennas 252a through 252r for facilitating wireless communications.

At the base station 105, a transmit processor 220 may receive data from a data source 212 and control information from a controller 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), or MTC physical downlink control channel (MPDCCH), among other examples. The data may be for the PDSCH, among other examples. The transmit processor 220 may process, such as encode and symbol map, the data and control information to obtain data symbols and control symbols, respectively. Additionally, the transmit processor 220 may generate reference symbols, such as for the primary synchronization signal (PSS) and secondary synchronization signal (SSS), and cell-specific reference signal. Transmit (TX) multiple-input multiple-output (MIMO) processor 230 may perform spatial processing on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream, such as for OFDM, among other examples, to obtain an output sample stream. Each modulator 232 may additionally or alternatively process the output sample stream to obtain a downlink signal. For example, to process the output sample stream, each modulator 232 may convert to analog, amplify, filter, and upconvert the output sample stream to obtain the downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition a respective received signal to obtain input samples. For example, to condition the respective received signal, each demodulator 254 may filter, amplify, downconvert, and digitize the respective received signal to obtain the input samples. Each demodulator 254 may further process the input samples, such as for OFDM, among other examples, to obtain received symbols. MIMO detector 256 may obtain received symbols from demodulators 254a through 254r, perform MIMO detection on the received symbols if applicable, and provide detected symbols. Receive processor 258 may process the detected symbols, provide decoded data for the UE 115 to a data sink 260, and provide decoded control information to a controller 280. For example, to process the detected symbols, the receive processor 258 may demodulate, deinterleave, and decode the detected symbols.

On the uplink, at the UE 115, a transmit processor 264 may receive and process data (such as for the physical uplink shared channel (PUSCH)) from a data source 262 and control information (such as for the physical uplink control channel (PUCCH)) from the controller 280. Additionally, the transmit processor 264 may generate reference symbols for a reference signal. The symbols from the transmit processor 264 may be precoded by TX MIMO processor 266 if applicable, further processed by the modulators 254a through 254r (such as for SC-FDM, among other examples), and transmitted to the base station 105. At base station 105, the uplink signals from the UE 115 may be received by antennas 234, processed by demodulators 232, detected by MIMO detector 236 if applicable, and further processed by receive processor 238 to obtain decoded data and control information sent by the UE 115. The receive processor 238 may provide the decoded data to data sink 239 and the decoded control information to the controller 240.

The controllers 240 and 280 may direct the operation at the base station 105 and the UE 115, respectively. The controller 240 or other processors and modules at the base station 105 or the controller 280 or other processors and modules at the UE 115 may perform or direct the execution of various processes for the techniques described herein, such as to perform or direct the execution illustrated in FIGS. 8 and 10, or other processes for the techniques described herein. The memories 242 and 282 may store data and program codes for the base station 105 and The UE 115, respectively. Scheduler 244 may schedule UEs for data transmission on the downlink or uplink.

In some cases, the UE 115 and the base station 105 may operate in a shared radio frequency spectrum band, which may include licensed or unlicensed, such as contention-based, frequency spectrum. In an unlicensed frequency portion of the shared radio frequency spectrum band, the UEs 115 or the base stations 105 may traditionally perform a medium-sensing procedure to contend for access to the frequency spectrum. For example, the UE 115 or base station 105 may perform a listen-before-talk or listen-before-transmitting (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. In some implementations, a CCA may include detection of specific sequences that indicate use of the channel. For example, another device may transmit a specific preamble prior to transmitting a data sequence. In some cases, an LBT procedure may include a wireless node adjusting its own back off window based on the amount of energy detected on a channel or the acknowledge or negative-acknowledge (ACK or NACK) feedback for its own transmitted packets as a proxy for collisions.

Figure 3:
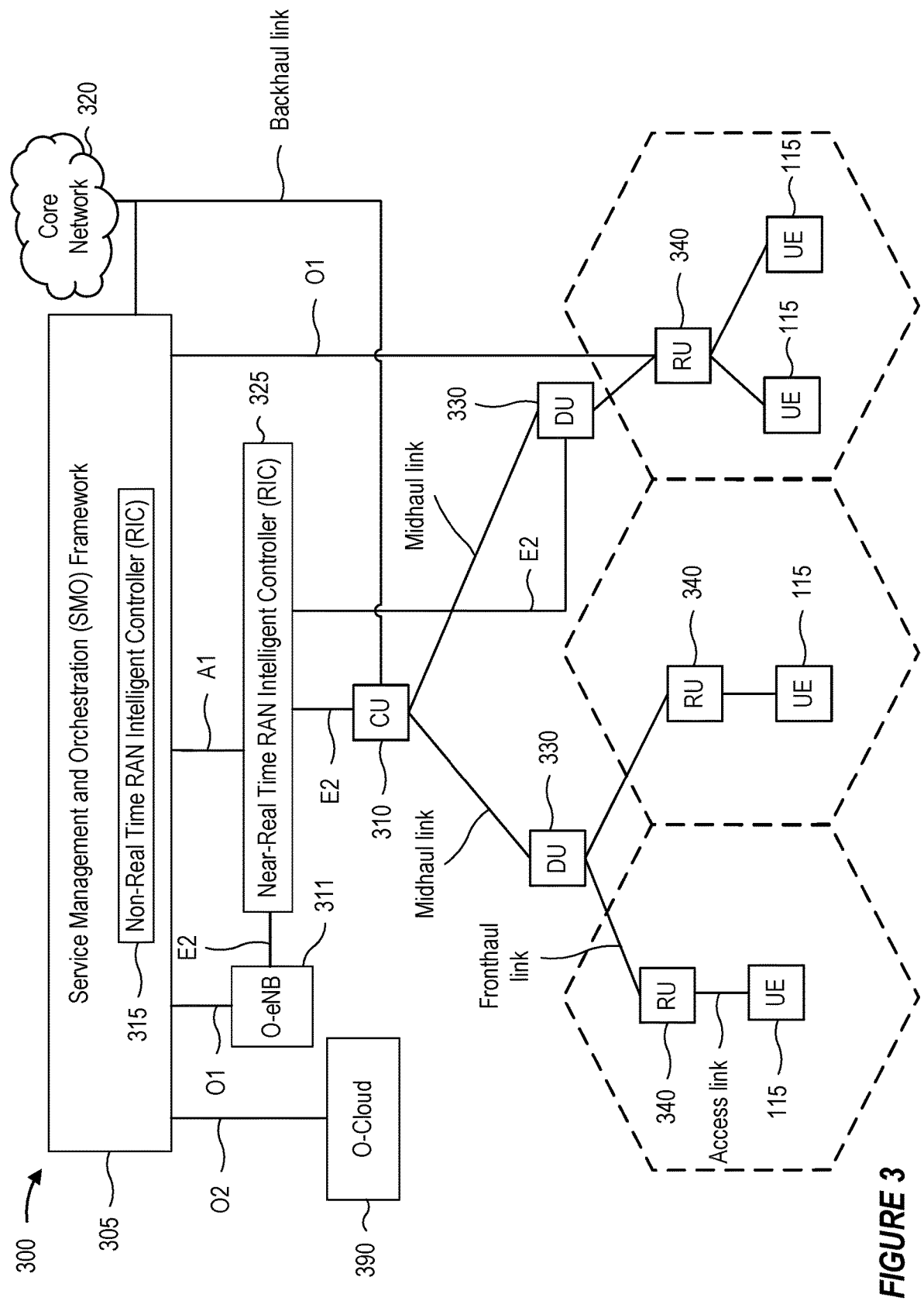
FIG. 3 shows a diagram illustrating an example disaggregated base station architecture according to one or more aspects.

FIG. 3 shows a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). Core network 320 may include or correspond to core network 130. A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 115 via one or more radio frequency (RF) access links. In some implementations, the UE 115 may be simultaneously served by multiple RUs 340.

Each of the units, i.e., the CUS 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 115. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUS 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As described herein, a node (which may be referred to as a node, a network node, a network entity, or a wireless node) may include, be, or be included in (e.g., be a component of) a base station (e.g., any base station described herein), a transmission and reception point (TRP), a UE (e.g., any UE described herein), a network controller, an apparatus, a device, a computing system, an integrated access and backhauling (IAB) node, a distributed unit (DU), a central unit (CU), a remote unit (RU), a core network, a LFM, and/or a another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first one or more components, a first processing entity, or the like configured to receive the information; and the second network node may refer to a second UE, a second base station, a second apparatus, a second device, a second computing system, a second one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

Figure 4:
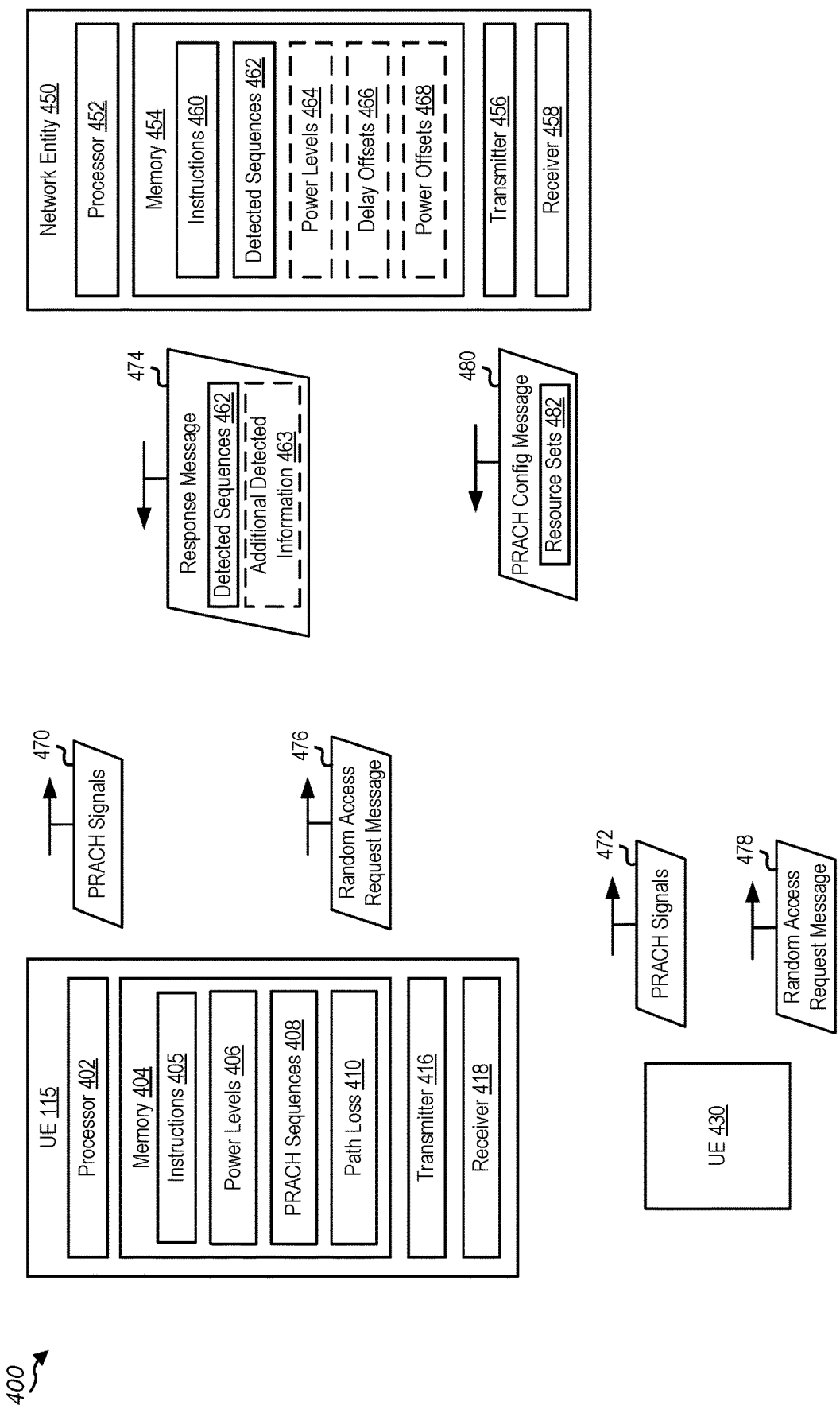
FIG. 4 is a block diagram illustrating an example wireless communication system that supports initial physical random access channel (PRACH) power control using multiple PRACH signals according to one or more aspects.

FIG. 4 is a block diagram of an example wireless communications system 400 that supports initial PRACH power control using multiple PRACH signals according to one or more aspects of the present disclosure. In some examples, the wireless communications system 400 may implement aspects of the wireless network 100. The wireless communications system 400 includes the UE 115, a UE 430, and a network entity 450, such as a base station. Although two UEs (e.g., the UE 115 and the UE 430) and one network entity 450 are illustrated, in some other implementations, the wireless communications system 400 may generally include more than two or fewer than two UEs, multiple network entities 450, or both.

The UE 115 can include a variety of components (such as structural, hardware components) used for carrying out one or more functions described herein. For example, these components can include one or more processors 402 (hereinafter referred to collectively as "the processor 402"), one or more memory devices 404 (hereinafter referred to collectively as "the memory 404"), one or more transmitters 416 (hereinafter referred to collectively as "the transmitter 416"), one or more receivers 418 (hereinafter referred to collectively as "the receiver 418"), and one or more antenna arrays 424 (hereinafter referred to collectively as "the antenna array 424"). The processor 402 may be configured to execute instructions 405 stored in the memory 404 to perform the operations described herein. In some implementations, the processor 402 includes or corresponds to one or more of the receive processor 258, the transmit processor 264, and the controller 280 of FIG. 2, and the memory 404 includes or corresponds to the memory 282 of FIG. 2.

The memory 404 includes or is configured to store the instructions 405, power levels 406, PRACH sequences 408, and a path loss 410. The power levels 406 represent transmit (TX) power levels at which UE 115 sends signaling or messages, such as PRACH signals, as further described herein. The PRACH sequences 408 include preamble or other PRACH sequences that are included in the PRACH signals that are transmitted by UE 115. The path loss 410 represents a UL path loss between the UE 115 and the network entity 450, which may be determined based on information received from the network entity 450, as further described herein.

The transmitter 416 is configured to transmit reference signals, control information and data to one or more other devices, and the receiver 418 is configured to receive references signals, synchronization signals, control information and data from one or more other devices. For example, the transmitter 416 may transmit signaling, control information and data to, and the receiver 418 may receive signaling, control information and data from, the network entity 450. In some implementations, the transmitter 416 and the receiver 418 may be integrated in one or more transceivers. Additionally or alternatively, the transmitter 416 or the receiver 418 may include or correspond to one or more components of the UE 115 described with reference to FIG. 2.

In some implementations, the UE 115 may include one or more antenna arrays. The one or more antenna arrays may be coupled to the transmitter 416, the receiver 418, or a communication interface. The antenna array may include multiple antenna elements configured to perform wireless communications with other devices, such as with the network entity 450. In some implementations, the antenna array may be configured to perform wireless communications using different beams, also referred to as antenna beams. The beams may include TX beams and RX beams. In some examples, the antenna array may include multiple independent sets (or subsets) of antenna elements (or multiple individual antenna arrays), and each set of antenna elements of the antenna array may be configured to communicate using a different respective beam that may have a different respective direction than the other beams. For example, a first set of antenna elements of the antenna array may be configured to communicate via a first beam having a first direction, and a second set of antenna elements of the antenna array may be configured to communicate via a second beam having a second direction. In other implementations, the antenna array may be configured to communicate via more than two beams. Alternatively, one or more sets of antenna elements of the antenna array may be configured to concurrently generate multiple beams, for example using multiple RF chains of the UE 115. Each individual set (or subset) of antenna elements may include multiple antenna elements, such as two antenna elements, four antenna elements, ten antenna elements, twenty antenna elements, or any other number of antenna elements greater than two. Although described as an antenna array, in other implementations, the antenna array may include or correspond to multiple antenna panels, and each antenna panel may be configured to communicate using a different respective beam.

The UE 430 may include a device, such as a mobile device or a stationary device. In some implementations, the UE 430 is a device that is configured to communicate with the UE 115, the network entity 450, or both. The UE 430 may include a variety of components (such as structural, hardware components) used for carrying out one or more functions described herein. For example, these components may include one or more processors, one or more memory devices, one or more transmitters, one or more receivers, and optionally an antenna array, as described above with reference to the UE 115. In some implementations, the UE 430 may include an interface (e.g., a communication interface) that includes a transmitter, a receiver, or a combination thereof. The one or more processors may be configured to execute instructions stored in the one or more memory devices to perform the operations described herein. In some implementations, the one or more processors include or correspond to one or more of the receive processor 258, the transmit processor 264, and the controller 280 of FIG. 2, and the one or more memory devices include or correspond to the memory 282 of FIG. 2. As such, the UE 430 may include one or more components of the UE 115 as described with reference to FIGS. 1-3.

The network entity 450 can include a variety of components (such as structural, hardware components) used for carrying out one or more functions described herein. For example, these components can include one or more processors 452 (hereinafter referred to collectively as "the processor 452"), one or more memory devices 454 (hereinafter referred to collectively as "the memory 454"), one or more transmitters 456 (hereinafter referred to collectively as "the transmitter 456"), one or more receivers 458 (hereinafter referred to collectively as "the receiver 458"), and one or more antenna arrays 459 (hereinafter referred to collectively as "the antenna array 459"). In some implementations, the network entity 450 may include or correspond to the base station 105 described with reference to FIGS. 1 and 2. The processor 452 may be configured to execute instructions 460 stored in the memory 454 to perform the operations described herein. In some implementations, the processor 452 includes or corresponds to one or more of the receive processor 238, the transmit processor 220, and the controller 240 of FIG. 2, and the memory 454 includes or corresponds to the memory 242 of FIG. 2.

The memory 454 includes or is configured to store the instructions 460, detected PRACH sequences 462, and optionally one or more of detected power levels 464, detected delay offsets 466, and suggested power offsets 468. These optional elements may be collectively be referred to as additional detected information 463. The detected PRACH sequences 462 represent PRACH sequences (e.g., preambles or preamble sequences) identified in detected PRACH signaling at network entity 450. The detected power levels 464 represent detected power levels of detected PRACH signals at the network entity 450. The detected delay offsets 466 represent delay offsets of PRACH signals that are detected by the network entity 450. The suggested power offsets 468 represent suggested power offsets to be applied to the power levels of the detected PRACH signals in order for UEs to increase a likelihood that signaling or messages communicated during an association process are detected at a target power level at the network entity 450.

The transmitter 456 is configured to transmit reference signals, synchronization signals, control information and data to one or more other devices, and the receiver 458 is configured to receive reference signals, control information and data from one or more other devices. For example, the transmitter 456 may transmit signaling, control information and data to, and the receiver 458 may receive signaling, control information and data from, the UE 115. In some implementations, the transmitter 456 and the receiver 458 may be integrated in one or more transceivers. Additionally or alternatively, the transmitter 456 or the receiver 458 may include or correspond to one or more components of base station 105 described with reference to FIG. 2.

In some implementations, the network entity 450 may include one or more antenna arrays. The antenna array may include multiple antenna elements configured to perform wireless communications with other devices, such as with the UE 115. In some implementations, the antenna array may be configured to perform wireless communications using different beams, also referred to as antenna beams. The beams may include TX beams and RX beams. In some examples, the antenna array may include multiple independent sets (or subsets) of antenna elements (or multiple individual antenna arrays), and each set of antenna elements of the antenna array may be configured to communicate using a different respective beam that may have a different respective direction than the other beams. For example, a first set of antenna elements of the antenna array may be configured to communicate via a first beam having a first direction, and a second set of antenna elements of the antenna array may be configured to communicate via a second beam having a second direction. In other implementations, the antenna array may be configured to communicate via more than two beams. Alternatively, one or more sets of antenna elements of the antenna array may be configured to concurrently generate multiple beams, for example using multiple RF chains of the network entity 450. Each individual set (or subset) of antenna elements may include multiple antenna elements, such as two antenna elements, four antenna elements, ten antenna elements, twenty antenna elements, or any other number of antenna elements greater than two. Although described as an antenna array, in other implementations, the antenna array may include or correspond to multiple antenna panels, and each antenna panel may be configured to communicate using a different respective beam.

In some implementations, the wireless communications system 400 implements a 5G NR network. For example, the wireless communications system 400 may include multiple 5G-capable UEs 115 and 430 and multiple 5G-capable network entities 450, such as UEs and base stations (or other network entities) configured to operate in accordance with a 5G NR network protocol such as that defined by the 3GPP. In some other implementations, the wireless communications system 400 implements a 6G network.

During operation of the wireless communications system 400, the UEs 115 and 430 may perform a PRACH initialization and power control procedure prior to (or as an initial part of) performing an association procedure with the network entity 450. During the PRACH initialization and power control procedure, each of the UEs 115 and 430 may transmit multiple PRACH signals at different power levels to the network entity 450, such as by sweeping PRACH signals in a burst at multiple power levels. For example, the UE 115 may transmit, to the network entity 450, a set of one or multiple PRACH signals (referred to herein as "PRACH signals 470") at multiple respective power levels (referred to herein as "power levels 406") during a time period. Each respective PRACH signal of the PRACH signals 470 may be transmitted by the UE 115 at a different respective power level of the power levels 406 than others of the PRACH signals 470. As a non-limiting example, the UE 115 may transmit a first PRACH signal at a first power level, a second PRACH signal at a second power level that is different from the first power level, a third PRACH signal at a third power level that is different from the first power level and the second power level, and a fourth PRACH signal at a fourth power level that is different from the first power level, the second power level, and the third power level. As another example, the UE 430 may transmit, to the network entity 450, a set of one or multiple PRACH signals (referred to herein as "PRACH signals 472") at multiple respective power levels during the time period. Each respective PRACH signal of the PRACH signals 472 may be transmitted by the UE 430 at a different respective power level, similar to as described with reference to the UE 115 and the PRACH signals 470. The PRACH signals 470 and 472 may be send during a same time period, such as a first PRACH TX interval, that is before a time during which the UEs 115 and 430 wait for a response from the network entity 450. In some implementations, at least some of the PRACH signals 470 may overlap at least some of the PRACH signals 472 in time. Alternatively, each of the UE 115 and the UE 430 may transmit the respective PRACH signals during non-overlapping portions of the time period.

In some implementations, the UEs 115 and 430 may select power levels for transmission of the respective PRACH signals according to a fixed pattern, such as a ramp up pattern. For example, a fixed pattern for power level selection include increasing the power level of each subsequent PRACH transmission by a particular amount, such as 5 decibels (dBs), as a non-limiting example. In some examples, the UE 115 may select the power levels 406 and transmit the PRACH signals 470 as a first PRACH signal at a first power level, a second PRACH signal at a second power level that is higher than the first power level (e.g., by an amount derived from a fixed pattern), and a third PRACH signal at a third power level that is higher than the second power level. The UE 430 may select power levels for transmission of PRACH signals 472 according to the same fixed pattern as the UE 115. By transmitting each subsequent PRACH signal at a higher power level, the UEs 115 and 430 may iteratively try different power levels until selecting one that achieves a target power level at the network entity 450. If each power level is separated by the same fixed value, the fixed value may be set at a value that balances competing goals of reducing the amount of time (and signaling) used to find a sufficient power level and in selecting a power level that is not higher than needed to achieve the target power level at the network entity 450. In some examples, setting the fixed value to a larger value may increase the speed with which a sufficient power level is found (e.g., and reduce the total number of PRACH transmissions), while setting the fixed value to a lower value may prevent, or reduce an amount of, overshooting the target power level.

In some other implementations, the UEs 115 and 430 may select power levels for transmission of the respective PRACH signals according to a random or pseudo-random pattern. For example, the UE 115 may randomly or pseudo-randomly select the power levels 406 for transmission of the PRACH signals 470. Similarly, the UE 430 may randomly or pseudo-randomly select the power levels for transmission of the PRACH signals 472. Randomly or pseudo-randomly selecting the power level for each PRACH signal may prevent one UE from blocking out signals transmitted by another UE due to differences in noise, path loss, distance, etc. For example, if the UE 115 is significantly closer to the network entity 450 than the UE 430 and the UEs 115 and 430 transmit the PRACH signals 470 and 472 according to the same fixed pattern, at least some of the PRACH signals 470 may be received with high enough power compared to the PRACH signals 472 to interfere with, and possibly prevent, reception of the PRACH signals 472 at power levels that would otherwise satisfy the target power level at the network entity 450. Stated another way, the higher power PRACH signals (e.g., the PRACH signals 470) may block reception of the lower power PRACH signals (e.g., the PRACH signals 472) because the lower power PRACH signals will be harder to detect under the interference from higher power PRACH signals over the same resource. Randomly selecting the power levels for each PRACH transmission decreases the likelihood of this occurring for consecutive PRACH signal transmissions. In some such implementations, the network entity 450 may be configured to perform successive interference cancellation (SIC) to attempt to successfully receive multiple PRACH signal transmissions over the same resource, to further improve the success provided by the random selection of power levels. In some implementations, each UE may be assigned a different pseudo-random selection pattern, and the network entity 450 may be able to identify which UEs transmitted the received PRACH signals by comparing the pseudo-random power level pattern to information indicating the pseudo-random selection assignment to various UEs. However, such implementations may require additional storage at the network entity 450 and an additional communication framework for communicating the pattern assignment (or pre-defined knowledge of the pattern assignment, which may limit the number of different UEs that could be supported by the network entity 450).

In addition to selecting power levels for the PRACH signals 470, 472, the UEs 115, 430 may select a respective PRACH sequence for each of the PRACH signals. The PRACH sequence, which may include or correspond to a preamble sequence, such as an NR preamble sequence, may be generated from a pool of possible PRACH sequences that is predefined or, in some implementations, indicated by the network entity 450, as further described below. The PRACH sequences may be selected to have some "correlation" to the PRACH sequences of later messages in an association process with the network entity 450. In some implementations, the UEs 115, 430 may select the PRACH sequences according to a fixed pattern. For example, the UE 115 may select the PRACH sequences 408 and transmit the PRACH signals 470 as a first PRACH signal with a first PRACH sequence, a second PRACH signal with a second PRACH sequence in the fixed pattern, and a third PRACH signal with a third PRACH sequence in the fixed pattern. The UE 430 may select PRACH sequences for transmission of PRACH signals 472 according to the same fixed pattern as the UE 115. Alternatively, some UEs may be assigned different fixed patterns for selecting PRACH sequences. In some other implementations, the UEs 115, 430 may randomly or pseudo-randomly select the PRACH sequences for the PRACH signals 470, 472. For example, the UE 115 may randomly or pseudo-randomly select the PRACH sequences 408 for the PRACH signals 470 such that a first PRACH signal is transmitted with a first random PRACH sequence, a second PRACH signal is transmitted with a second random PRACH sequence, and a third PRACH signal is transmitted with a third random PRACH sequence. The UE 430 may randomly or pseudo-randomly select the PRACH sequences for transmitting the PRACH signals 472 in a similar manner. Such random or pseudo-random selection of PRACH sequences may reduce the number of collisions, resulting in a decreased number of PRACH signals having the same PRACH sequences over the same resources. Although occasional PRACH sequence collisions may occur, such collisions may be infrequent enough to be outweighed by the benefits of using a less-complicated sequence selection scheme (e.g., the random or pseudo-random selection scheme). In some other implementations, PRACH sequence selection may be based on a group-hopping sequence in association with wireless communication resources over which the associated PRACH signals are to be transmitted.

In some implementations, PRACH signal transmission may be allocated to particular sets of wireless communication resources (e.g., to groups of wireless communication resource blocks). Such particular wireless communication resources may be indicated by the network entity 450. For example, the network entity 450 may transmit a PRACH configuration message 480 to the UEs 115, 430. The PRACH configuration message 480 indicates one or more resource sets 482 of wireless resource blocks for use by the UEs 115, 340 in the transmission of PRACH signals. The one or more resource sets indicated by the PRACH configuration message 480 may include different wireless resource blocks than are allocated to other messaging in an association process in order to prevent interference of the PRACH signals with the other messaging. In some implementations, the PRACH configuration message 480 is a radio resource control (RRC) message or the PRACH resource configuration is otherwise RRC-configured. The UEs 115, 430, may transmit the PRACH signals 470, 472 over wireless communication resource blocks selected from the resource sets 482. For example, the UE 115 may transmit each of the PRACH signals 470 via a different wireless resource block of a selected resource set, or multiple sets, of the resource sets 482. In some implementations, the UEs 115, 430 may randomly or pseudo-randomly select the wireless resource blocks of a selected resource set to transmit the PRACH signals 470, 472. Each selected resource block may be referred to as a transmit opportunity (XO). Additional details of resource block allocation and selection, and transmit opportunities, are described further herein, with reference to FIG. 5.

After transmission of the PRACH signals 470, 472 by the UEs 115, 430, the network entity 450 may detect at least some of the transmitted PRACH signals. In some examples, the network entity 450 may be configured to detect PRACH signals in a best effort fashion, but not all PRACH transmissions are detectable by the network entity 450, such as due to the power level being too low (e.g., below a target level) or an interference level being too high. For example, the network entity 450 may be unable to detect a PRACH signal (of the PRACH signals 470) that is transmitted with at a power level that is less than the target power level for detection at the network entity 450. As another example, the network entity 450 may be unable to detect a particular PRACH signal (of the PRACH signals 472) even if the power level used by the UE 430 is greater than the target power level if the particular PRACH signal at least partially overlaps with transmission by another PRACH signal (of the PRACH signals 470) that is transmitted at a significantly higher power level or if the channel between the UE 430 and the network entity 450 sufficiently degrades the signal quality. In some implementations, the network entity 450 is configured to perform PRACH detection according to the same PRACH detection scheme associated with receiving other messages of an association process, such as "msg1" or "msgA". Although there is no guarantee that the network entity 450 will detect all the transmitted PRACH signals, the power level selection, PRACH sequence selection, wireless resource allocation and selection, and transmission time interval can be designed to achieve various target likelihoods of at least receiving one PRACH signal, or at least one PRACH signal from each UE. In some implementations, the network entity 450 is configured to perform at least some SIC to increase the amount of detected PRACH signals under imbalanced power.

After performing PRACH detection, the network entity 450 may identify one or more detected PRACH signals and associated transmit opportunities (e.g., transmit opportunities via which the PRACH signals were detected, which may correspond to time resources, frequency resources, spatial resources, or a combination thereof). Additionally, because the detected PRACH signals were successfully detected, the network entity is able to extract and decode the detected PRACH sequences 462 associated with each detected PRACH signal. The network entity 450 may also be able to determine or derive other related information related from the detected PRACH signals, such as the detected power levels 464, the delay offsets 466, the power offsets 468, other metrics, or a combination thereof. However, in at least some implementations, the network entity 450 is not able to determine which UE is the sender of a detected PRACH signal, nor is it able to determine how may detected PRACH signals were transmitted by each UE. Because the network entity 450 does not possess, and is unable to determine, which UEs sent the detected PRACH signals, information identifying the selected signals is provided to the UEs in order for the UEs to determine whether or not any of their transmitted PRACH signals were detected, and if so, which power levels are associated with detection at the network entity 450.

In order to provide this information, the network entity 450 may transmit a response message 474 to the UEs 115, 430 to indicate which PRACH signals were detected at the network entity 450. In some implementations, the response message 474 may be communicated via a PDSCH, similar to other random access response (RAR) messages during an association process. To schedule transmission of the response message 474, the network entity 450 may transmit downlink control information (DCI) that indicates a response message is to be transmitted via an upcoming PDSCH. In some implementations, the DCI may include a radio network temporary identifier (RNTI) that is associated with the resource set from which PRACH signals were detected. For example, a first DCI may include a first RNTI that indicates scheduling of a response message associated with PRACH signals from a first resource set, and a second DCI may include a second RNTI that indicates scheduling of a response message associated with PRACH signals from a second resource set that is different than the first resource set. As such, a UE may receive the DCI and determine whether to monitor for the response message based on whether the UE transmitted PRACH signals using the resource set associated with the RNTI included in the DCI.

The response message 474 may indicate a single set of detected PRACH signals at the network entity 450. For example, the single set of detected PRACH signals may include zero, one, or more than one of the PRACH signals 470 and zero, one, or more than one of the PRACH signals 472. To indicate the single set detected PRACH signals, the response message 474 may include the detected PRACH sequences 462 (e.g., at least a portion of each respective PRACH sequence included in the detected PRACH signals). The detected PRACH sequences 462 may be indicated by sequence index, by a partial sequence, or in any other way to identify the PRACH sequence to the UEs. In some implementations, the response message 474 may include additional information beyond identification of the detected PRACH sequences 462. For example, the response message 474 may include additional detected information 463, which, in the example illustrated in FIG. 4, may include the detected power levels 464, the delay offsets 466, the power offsets 468, or a combination thereof.

The additional detected information 463 may assist the UEs to perform collision resolution and thus result in better power control for messaging during the association process.

The UEs 115, 340 may receive the response message 474 and determine whether any of their transmitted PRACH signals were detected by the network entity 450 based on the response message 474. For example, the UE 115 may compare the PRACH sequences 408 associated with the PRACH signals 470 to the detected PRACH sequences 462 to determine if any of the PRACH sequences 408 are included in the detected PRACH sequences 462, and if so, the PRACH signals associated with the identified PRACH sequences are determined to have been detected by the network entity 450. In some implementations, if one of the PRACH sequences 408 is included in the detected PRACH sequences 462, the UE 115 may identify the associated PRACH signal as being detected by the network entity 450. In some other implementations, there is the possibility for collision between PRACH signals from multiple UEs, such as two UEs that both randomly select the same PRACH sequence for transmission of PRACH signals over the same wireless resource blocks. For this reason, upon identifying one or more of the PRACH sequences 408 that are included in the detected PRACH sequences 462, the UE 115 may prune identified PRACH sequences that are not likely intended for the UE 115 (e.g., due to collision, interference, etc.). In some implementations, the response message 474 includes the detected PRACH sequences 462 as well as indication of which wireless communication blocks the detected PRACH sequences 462 were received over, and optionally the additional detected information 463. The pruning may include the UE 115 comparing the wireless resource resource blocks used to transmit the associated PRACH signals of the identified PRACH sequences 408 to the wireless resource blocks associated with the detected PRACH sequences 462 and discarding any of the identified PRACH sequences 408 for which the wireless resource blocks are not the same.

In some implementations, the pruning may include considering the detected PRACH sequences 462 and the PRACH sequences 408 jointly instead of individually. In such implementations, the UEs 115, 430 may be configured to prune, or ignore, identified PRACH sequences if other PRACH signals were transmitted at higher power levels and the associated PRACH sequences are not included in the detected PRACH sequences 462. In some examples, if the UE 115 transmits a first PRACH signal S1 having a first PRACH sequence Seq1 at a first power level P1 and a second PRACH signal S2 having a second PRACH sequence Seq2 at a second power level P2 that is higher than P1, but the detected PRACH sequences 462 only include Seq1, it is more likely that another UE (e.g., the UE 430) also transmitted a PRACH signal with Seq1 and that the detection of Seq1 is from the other PRACH signal. This determination is based on S2 not being detected by the network entity 450, even though it had higher power than S1. In this example, the UE 115 may ignore Seq1, such that if that was the only identified PRACH sequence of the PRACH sequences 408 that is included in the detected PRACH sequence 462, the UE 115 may determine that the network entity 450 did not detect any of the PRACH signals 470. Additionally or alternatively, the UEs may perform pruning using the additional detected information 463. In such implementations, the UEs 115, 430 may be configured to prune, or ignore, identified PRACH sequences that are included in the detected PRACH sequences 462 if the corresponding levels of power levels 406 are not also included in the detected power levels 464. Using the above example of the UE 115 transmitting the PRACH signals S1 and S2, and the PRACH sequences Seq1 and Seq2 being included in both the PRACH sequences 408 and the detected PRACH sequences 462, if the additional detected information 463 includes the detected power levels 464, the UE 115 may compare the power levels 406 to the detected power levels 464 to assist in the pruning process. For example, if the power level P2 is 6 dB higher than P1 in the power levels 406, but the detected power levels 464 indicate that P1 is 3 dB higher than P2 and that P2 is approximately 6 dB, then the UE 115 may determine that the inclusion of Seq1 in the detected PRACH sequences 462 is meant for a different UE, and that the PRACH signal transmitted by the UE 115 with Seq1 was not detected by the network entity 450. As another example, if the additional detected information 463 includes the delay offsets 466 and the UE 115 identifies multiple PRACH signals from the PRACH sequences 408 that are included in the detected PRACH sequences 462, the UE 115 may prune, or ignore, one or more of the identified PRACH sequences if those PRACH sequences are associated with different delay offsets in the delay offsets 466 than a remainder of the identified PRACH sequences, as these detected PRACH sequences are likely from other UEs using the same PRACH sequence for transmissions over the same wireless resource blocks.

After performing the pruning, the UEs 115, 430 may select the lowest power level associated with the remaining identified PRACH sequences (and the associated PRACH signals) for transmission during an association process with the network entity 450. For example, if two remaining identified PRACH sequences of the PRACH sequences 408 are included in the detected PRACH sequences 462, PRACH sequences Seq1 and Seq4 (which correspond to PRACH signals S1 and S4 that were transmitted at power level P1 and P4, respectively), the UE 115 may select the lower of P1 and P4 as the selected power level for association messaging with the network entity 450. Similarly, if two remaining identified PRACH sequences of the respective PRACH sequences of PRACH signals 472 are included in the detected PRACH sequences 462, PRACH sequences Seq2 and Seq5 (which correspond to PRACH signals S2 and S5 that were transmitted at power level P2 and P5, respectively), the UE 430 may select the lower of P2 and P5 as the selected power level for association messaging with the network entity 450. Although described above as selecting the lowest power level associated with remaining identified PRACH sequences, such selection may be based on a "good enough" configuration that prioritizes UEs using lower transmission power to conserve power at the UEs. In other implementations, the selection may be based on a configuration that prioritizes reducing signaling used to achieve the target power level at the network entity 450, and as such the highest power level associated with remaining identified PRACH sequences may be selected. If only a single identified PRACH sequence remains, selection according to either configuration is moot.

In some implementations, the selected power level may be adjusted (prior to transmission of messaging at the selected power level) based on additional information from the network entity 450. In some examples, if the additional detected information 463 includes the power offsets 468, the UEs 115, 430 may each increase the selected power level based on one of the power offsets 468. For example, if the UE 115 identifies a single one of the PRACH sequences 408 that is included in the detected PRACH sequences 462, the UE 115 may increase the selected power level by the amount of one of the power offsets 468 that corresponds to the PRACH sequence that is included in both the PRACH sequences 408 and the detected PRACH sequences 462. As another example, if the UE 115 identifies two of the PRACH sequences 408 that are included in the detected PRACH sequences 462, the UE 115 may increase each of the associated power levels by the two of the power offsets 468 that correspond to the PRACH sequences that are included in both the PRACH sequences 408 and the PRACH sequences 462 before selecting the lower (or higher) of the two increased power levels as the selected power level.

Additionally or alternatively, the selected power levels may be adjusted (prior to transmission of messaging at the selected power level) based on a path loss between the respective UE and the network entity 450 if the additional detected information 463 in the response message 474 includes the detected power levels 464. For example, if the UE 115 identifies a single one of the PRACH sequences 408 that is included in the detected PRACH sequences 462, the UE 115 may determine a path loss 410 based on the associated power level, of the power levels 406, and one of the detected power levels 464 that corresponds to the PRACH sequence that is included in both the PRACH sequences 408 and the detected PRACH sequences 462. The UE 115 may determine the path loss 410 in an open loop manner, similar to conventional open loop power control, because the detected power levels 464 indicate power levels associated with the uplink communication channel between the UE 115 and the network entity 450 and not the downlink channel, which may have different channel characteristics due to differences in frequency ranges or TRPs. In addition to determining the path loss 410, the UE 115 may adjust the selected power level to account for the path loss 410, such as via the open loop power adjustment. As another example, if the UE 115 identifies multiple of the PRACH sequences 408 as being included in the detected PRACH sequences 462, the UE 115 may determine a path loss 410 for each of the multiple associated signals of the PRACH signals 470 in the same manner, and the UE 115 may use an aggregated path loss for adjusting the selected power level. The aggregated path loss may be a minimum of the multiple path loss values, an average path loss value, a maximum of the multiple path loss values, a mode of the multiple path loss values, or another statistical value derived from the multiple path loss values. As can be appreciated from these examples, the path loss may be determined, and the selected power level adjusted, without additional transmission of messages between the UEs 115, 430 and the network entity 450, which increases a speed of the power control process and decreases congestion in the wireless communications system 400 as compared to performing a conventional, open loop power control process.

After selecting the respective power levels, the UEs 115, 430 may initiate an association process (or a next stage of an association process) with the network entity 450 using messaging transmitted at the respective selected power level. For example, the UE 115 may transmit a random access request message 476 at the selected power level of the power levels 406, such as the lower (or higher) of P1 and P4 in the example described above. As another example, the UE 430 may transmit a random access request message 478 at the selected power level determined at the UE 430, such as the lower (or higher) of P2 and P5 in the example described above. In some implementations, the random access request messages 476, 478 include or correspond to the first message of a 4-step association process, also known as "msg1", or the first message of a 2-step association process, also known as "msgA". The network entity 450 may receive the random access request messages 476, 478 at a higher likelihood of being at or above the target power level, and upon receipt, the network entity 450 may proceed with the respective association processes, such as by transmitting random access response messages such as "msg2" or "msgB".

As described with reference to FIG. 4, the present disclosure provides techniques for supporting a process for UEs, such as the UEs 115 and 430, to perform initialization and power control using multiple PRACH signals prior to performing other steps of an association process with a network entity, such as the network entity 450. For example, the UE 115 may transmit the PRACH signals 470 during a time period, the UE 430 may transmit the PRACH signals 472 during the time period, and the network entity 450 may report, in the response message 474, each of the PRACH signals that are detected at the network entity 450 during the time period. This initialization and power control using multiple PRACH signals may enable the UEs 115 and 430 to each determine a respective power level for transmitting messages as part of respective association processes that is more likely to be detectable at the network entity 450 than using an open loop power control, particularly if the DL and UL channels are not sufficiently similar in frequency. In some examples, because the UE 115 transmits multiple PRACH signals 470 at different respective power levels, the network entity 450 is more likely to detect at least one of the PRACH signals 470, which may be indicated by the network entity 450 including the detected PRACH signal or signals in the response message 474. Such increased chance of detection by the network entity 450 increases the chances that the UE 115 can determine an appropriate power level after receiving a single response message, such as the response message 474, instead of performing multiple cycles of transmitting a respective PRACH signal and receiving a respective response message. Although such a sequential process may not take long if the DL path loss is sufficiently representative of the UL path loss, if the DL and UL channels are sufficiently separated in frequency, an initial power level selected to compensate for the DL path loss may compensate for the UL path loss, and thus the UE 115 may perform several iterations of transmitting respective PRACH signals and monitoring for respective response messages. Additionally, if the UE 115 identifies that multiple of the PRACH signals 470 were detected by the network entity 450, the UE 115 may use a lowest power level associated with the identified PRACH signals to avoid using more power than needed to achieve a target power level at the network entity 450. As such, the wireless communications system 400 may provide for more efficient, in terms of speed and network congestion, initialization and power control for UL transmissions by a UE for disparate-frequency DL and UL channels as compared to other wireless communications systems.

Figure 5:
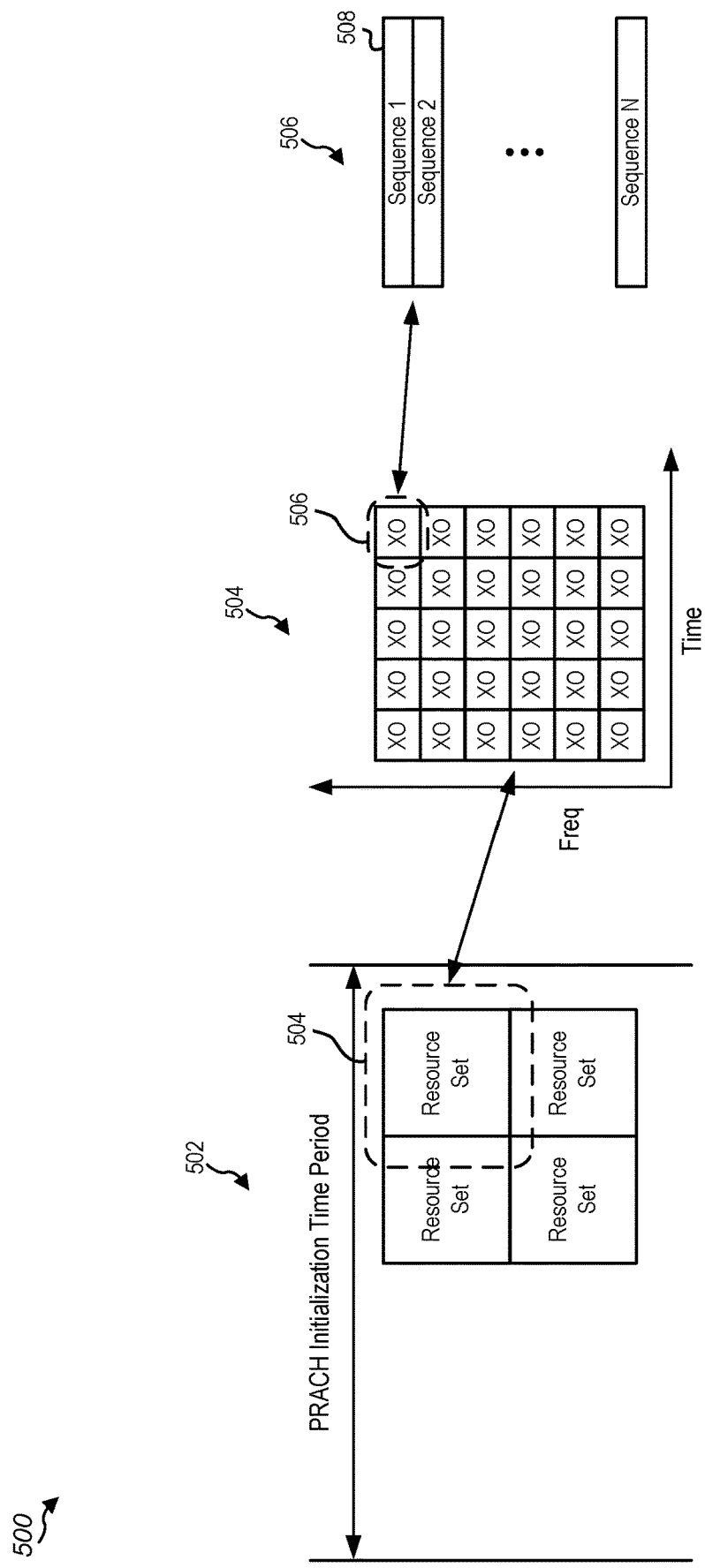
FIG. 5 is a diagram illustrating an example of wireless communication resources configured for PRACH signal transmission during initialization and power control according to one or more aspects.

FIG. 5 is a diagram illustrating example wireless communication resources 500 configured for PRACH signal transmission during initialization and power control according to one or more aspects of the present disclosure. In some implementations, the wireless communication resources may be allocated in the PRACH configuration message 480 of FIG. 4 or predefined at network entities and UEs, such as network entity 450 and UEs 115 and 430 of FIG. 4.

The wireless communication resources 500 may be allocated into one or more resource sets 502 of wireless resource blocks with respect to a time domain and a frequency domain. Each wireless resource block may correspond to a transmit opportunity (XO) for transmission of a PRACH signal, such that each resource set of the one or more resource sets 502 includes a respective set of multiple wireless resource blocks (e.g., transmit opportunities). The one or more resource sets 502 may include portions of a PRACH initialization time period, such as the time period during which the UEs 115, 430 of FIG. 4 transmit the PRACH signal 470, 472, respectively. Different resource sets of the one or more resource sets 502 may be associated with different transmission time segments, such as intervals, segments, slots, etc., of the PRACH initialization time period, as shown in FIG. 5. In some implementations, there may be separate resource pools (e.g., one or more resource sets) for each different synchronization signal block (SSB) beam, similar to some implementations of resource pools for "msg1" transmission. Each such resource pool may have a defined PRACH time period that corresponds to the PRACH initialization time period for UEs that use the SSB beam for information form a network entity. Alternatively, different resource sets of the one or more resource sets 502 may be allocated to different SSB beams, or allocation of resource pools or resource sets may be based on other criteria, such as types of UEs, location of UEs relative to a network entity, or other criteria. Each resource set may be defined within a resource pool using wireless resource blocks, which may correspond to defining the resources with respect to the time and frequency domains for the purpose of time division multiplexing (TDM) and frequency division multiplexing). As such, the resources may represent a combination of frequencies, frequency ranges, carriers, bandwidths, bandwidth parts, etc., from the frequency domain and slots, frames, sub-frames, intervals, periods, etc., from the time domain.

In the example shown in FIG. 5, the one or more resource sets 502 include four resource sets, including an illustrative resource set 504. An expanded view of the resource set 504 is illustrated in which it is shown that the resource set 504 includes a set of multiple wireless resources, also referred to as wireless resource blocks. Each wireless resource block may be defined to include a set of time and frequency resources to support transmission of a PRACH signal, such as any of the PRACH signals 470, 472 of FIG. 4. For this reason, each wireless resource block is also referred to as a transmit opportunity. In the example shown in FIG. 5, the resource set 504 includes thirty transmit opportunities, including an illustrative transmit opportunity 506, which are allocated such that six transmit opportunities of different frequencies are allocated for each of five different time intervals to make up the resource set 504. Such a transmit opportunity allocation may be similar to an allocation of transmit opportunities to resource sets used for "msg1" communications in conventional open loop power control schemes. In other examples, transmit opportunities may be allocated to include more or fewer than thirty in a resource set, to include more or fewer than six transmit opportunities at each time interval, to include more or fewer than five time intervals per resource set, or any combination thereof. In some implementations, to limit the amount of time UEs spend monitoring for reply messages after transmitting PRACH signals, a DL DCI that schedules a reply message may include an indicator of which resource set of the one or more resource sets 502 that the scheduled reply message is associated with.

In some implementations, each UE may select one or more transmit opportunities from a resource set for transmitting PRACH signals. In such implementations, a UE may select one transmit opportunity (e.g., wireless resource block) from each time interval via which to transmit PRACH signals, one transmit opportunity from each pair of time intervals, a single transmit opportunity, or some other subset of transmit opportunities that does not exceed one per time interval. For example, a UE may randomly or pseudo-randomly select a transmit opportunity in one of six frequency ranges at each of the five time intervals in the example shown in FIG. 5. In some implementations, the UE may be configured to avoid picking the same frequency range at consecutive time intervals or within the resource set 504, but in other implementations, no such restrictions are imposed. Selecting transmit opportunities at each of the time intervals (e.g., near continuous), or at least at multiple different time intervals, may enable a UE to transmit more PRACH signals during the PRACH initialization time period, thereby increasing the chances of finding a power level that is detected at a network entity above a target power level. However, configuring UEs to use only a subset of the time intervals may enable more UEs to communicate PRACH signals during the time period without increasing the allocation of frequency resources to the resource set 504 and may also reduce collisions with other UEs.

In addition to selecting which transmit opportunities to use to transmit PRACH signals, a UE is configured to select a PRACH sequence to use to generate the PRACH signal. As shown in the expanded example of the transmit opportunity 506 illustrated in FIG. 5, a PRACH sequence space may be allocated to N different PRACH sequences, including an illustrative PRACH sequence 508, and for each transmit opportunity selected by a UE, the UE also selects one of the N PRACH sequences for transmitting a respective PRACH signal. Although three PRACH sequences are shown in FIG. 5, in other implementations, N may be less than or greater than three. Because a network entity has likely not received communication from the UE prior to the transmission of the PRACH signal, the network entity may be unable to identify which device sent a detected PRACH signal. However, by allocating a known PRACH sequence space into these N PRACH sequences, the network entity may be able to decode and identify a PRACH sequence from a detected PRACH signal, and the PRACH sequence may be used as identifying information when sent to the UE for determining whether the UE's PRACH signals were received.

As explained above with reference to FIG. 4, the UEs may select the transmit opportunities (e.g., the wireless resource blocks) and the PRACH sequences according to a fixed pattern or by random or pseudorandom selection. For example, each UE may select a transmit opportunity for one or more time intervals according to a fixed frequency hopping pattern, such as an increasing frequency hopping pattern or a decreasing frequency hopping pattern. In such examples, different UEs may be configured to start at different frequency transmit opportunities, such as based on a device ID or other identifying information. As another example, each UE may randomly or pseudo-randomly select a frequency for a transmit opportunity at each time interval that the UEs will transmit PRACH signals. Although collisions may occur, size of the resource set and number of devices assigned to a resource set can be configured to reduce the likelihood of collision, and pruning or collision handling operations can be performed, as described above with reference to FIG. 4. Similar selection may occur with respect to PRACH sequences. For example, each UE may select a PRACH sequence according to a fixed pattern, such as an increasing or decreasing pattern, an alternating pattern, or any type of fixed pattern. The UEs may select a starting PRACH sequence based on a device ID or other identifying information to avoid each UE picking the same PRACH sequences for the same transmit opportunities. As another example, the UEs may randomly or pseudo-randomly select each PRACH sequence from the N PRACH sequences for each transmit opportunity. Although collisions may occur, size of the sequence space and number of devices assigned to a resource set can be configured to reduce the likelihood of collision, and pruning or collision operations can be performed, as described above with reference to FIG. 4.

Figure 6:
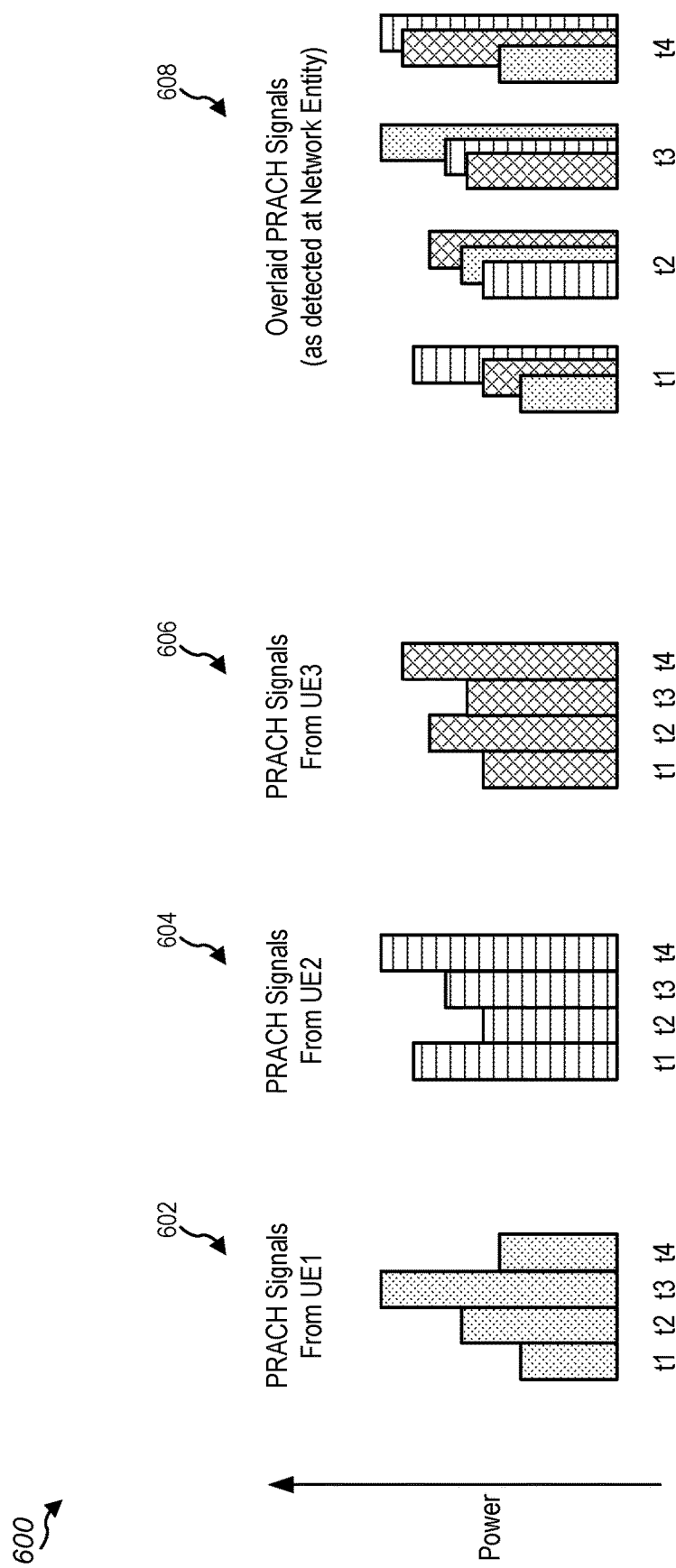
FIG. 6 illustrates examples of PRACH signals transmitted during initialization and power control according to one or more aspects.

FIG. 6 illustrates examples of PRACH signals 600 transmitted during initialization and power control according to one or more aspects of the present disclosure. As shown in FIG. 6, the PRACH signals 600 include first PRACH signals 602 that are transmitted by a first UE, second PRACH signals 604 that are transmitted by a second UE, and third PRACH signals 606 that are transmitted by a third UE. The first PRACH signals 602 may include or correspond to the PRACH signals 470 that are transmit by the UE 115 of FIG. 4, the second PRACH signals 604 may include or correspond to the PRACH signals 472 that are transmit by the UE 430 of FIG. 4, and the third PRACH signals 606 may include or correspond to PRACH signals that are transmit by a third UE that is not shown FIG. 4. The PRACH signals 602-606 may be received at a network entity, such as the network entity 450 of FIG. 4, which is illustrated in FIG. 6 as overlaid PRACH signals 608.

In the example shown in FIG. 6, each UE transmits four PRACH signals at different time intervals of a PRACH initialization time period: a first interval t1, a second interval t2, a third interval t3, and a fourth interval t4, and each UE randomly or pseudo-randomly selects a power level for each PRACH signal transmission (which is corresponds to a vertical direction in FIG. 6). The overlaid PRACH signals 608 illustrate the three PRACH signals transmit by each of the three UEs at each of the four time intervals t1-t4.

A network entity will typically detect PRACH signals in a resource set that are transmitted with high enough power and that have high enough signal-to-noise ratio (SNR) or signal-to-interference-plus-noise ratio (SINR), but a network entity will typically not detect PRACH signals in a resource set that are transmitted with low power, such as below a target power level, or that have sufficiently low SNR or SINR. As such, the network entity may not detect the first PRACH signal 602 at interval t4, which may be transmitted at a power level that is higher than the target power level, because of interference from higher power signals such as the second PRACH signal 604 and the third PRACH signal 606. Although this may occur do to the random selection of the power levels, it is unlikely to occur at multiple time intervals, and thus a UE that is weaker in power at one interval may be stronger at a different interval. For example, at the previous interval, t3, the first UE transmitted the first PRACH signal 602 that was strongest of all the received PRACH signals, as shown by the overlaid PRACH signals 608 at t3. As can be appreciated, configuring the UEs to randomly or pseudo-randomly select power levels for transmitting PRACH signals may reduce collisions as compared to using fixed patterns, such as a ramp up pattern, and although some collisions may still occur, the likelihood can be decreased further by decreasing the number of UEs assigned to a resource set or increasing the number of time intervals of transmit opportunities in a resource set.

Figure 7:
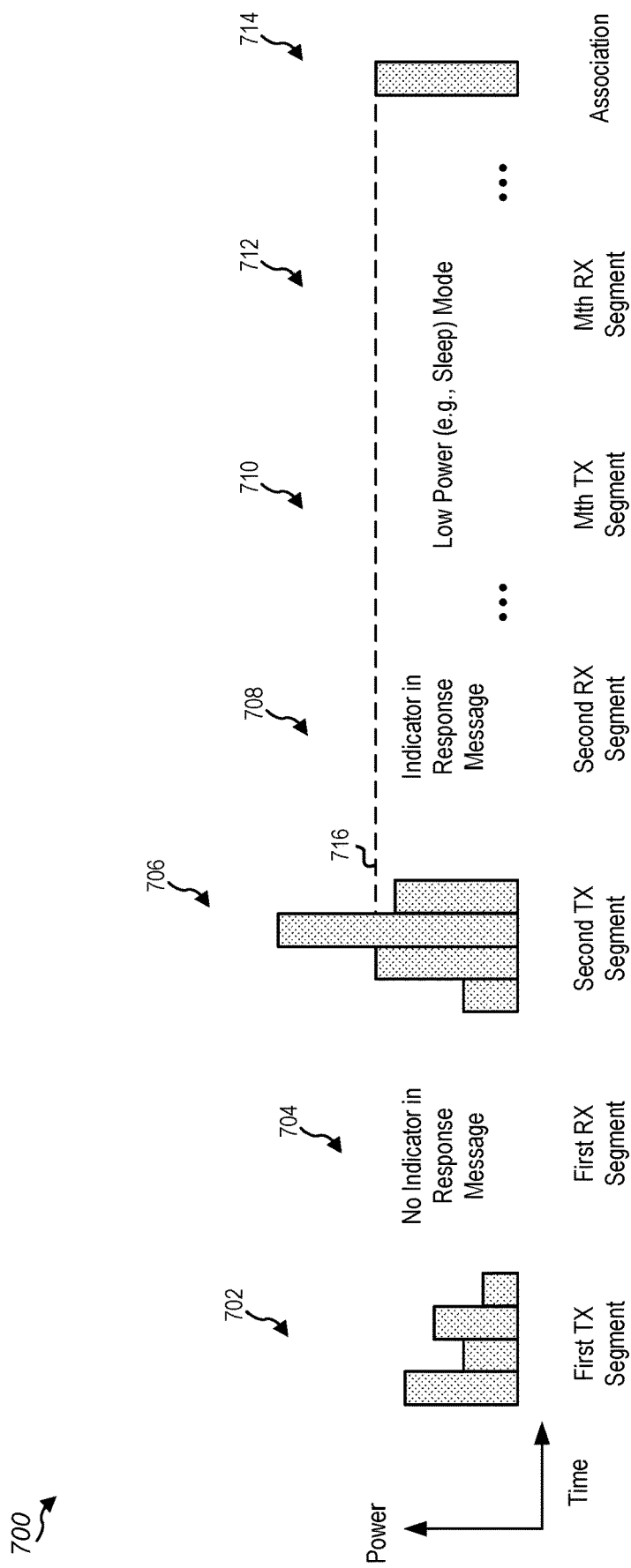
FIG. 7 illustrates an example of initialization and power control using multiple PRACH signals by a UE according to one or more aspects.

FIG. 7 illustrates an example of initialization and power control using multiple PRACH signals by a UE according to one or more aspects of the present disclosure. In some implementations, the PRACH signals illustrated in FIG. 7 may include or correspond to the PRACH signals 470 transmitted by the UE 115 of FIG. 4. As compared to the PRACH initialization process described with reference to FIG. 4, a PRACH initialization process 700 may include multiple transmit (TX) segments and multiple receive (RX) segments, and UEs may be configured to enter a low power operating mode (e.g., a sleep mode) during later TX segments and RX segments if the UEs have identified a transmitted PRACH signal that is the same as a detected PRACH signal reported by a network entity. This may be referred to as performing early termination of the PRACH initialization process 700. Transitioning to the low power operating mode during TX and RX segments that a UE does not need to make use of enables the UE to conserve power as compared to remaining active but not transmitting PRACH signals or monitoring for response messages that are not intended for the UE.

In the example shown in FIG. 7, the PRACH initialization process 700 includes, in order of occurrence, a first TX segment 702, a first RX segment 704, a second TX segment 706, a second RX segment 708, an Mth TX segment 710, and an Mth RX segment 712. The PRACH initialization process 700 is followed by an association process 714, during which the UEs may perform association operations with the network entity, such as transmitting random access request messages such as "msg1" or "msgA" at selected power levels. Although three TX and RX segments are illustrated in FIG. 7, in other implementations, the PRACH initialization process 700 may include fewer than three or more than three TX and RX segments. In some implementations, different resource sets may be associated with different TX segments. For example, the first TX segment 702 may be associated with the resource set 504 of FIG. 5, the second TX segment 706 may be associated with a second resource set of the one or more resource sets 502, and the Mth TX segment 710 may be associated with a third resource set of the one or more resource sets 502. Alternatively, one or more of the TX segments 702, 706, and 710 may be associated with the same resource set. Although FIG. 7 illustrates PRACH signaling of one UE, such as the UE 115 of FIG. 4, other UEs may transmit PRACH signals during the various TX segments.

During the first TX segment 702, the UE may transmit multiple PRACH signals. The UE may transmit the PRACH signals at different power levels, such as according to a fixed pattern, or according to random or pseudo-random selection (as shown in FIG. 7). Due to selection of power levels that are too low, or other interference, the network entity may be unable to detect any of the PRACH signals from the UE, and during the first RX segment 704 the network entity may transmit a response message that does not identify any PRACH sequence used by the UE. The UE may receive and process the response message and, responsive to determining that the detected PRACH sequences included in the response message do not include any PRACH sequence used by the UE, the UE may remain in an active operating mode after the first RX segment 704.

During the second TX segment 706, the UE may again transmit multiple PRACH signals at different randomly selected power levels. This time, the UE selects at least one power level that is high enough to be detected by the network entity. In the particular example shown in FIG. 7, the second and third PRACH signals are detected by the network entity. During the second RX segment 708, the UE receives another response message that identifies the PRACH sequences associated with the second and third PRACH signals. The UE may select the lower of the two power levels (e.g., the power level of the second PRACH signal) as a selected power level 716 for use during the association process 714, as described above with reference to FIG. 4. In some implementations, the selected power level 716 may be adjusted, such as based on a determined path loss or a suggested power offset from the network entity. Additionally, based on detection of at least one PRACH signal transmitted during the second TX segment 706 being included in the PRACH signals indicated by the response message in the second RX segment 708, the UE transitions to the low power operating mode after the second RX segment 708 (e.g., the UE early terminates the PRACH initialization process 700). During the remaining TX and RX segments, such as the Mth TX segment 710 and the Mth RX segment 712, other UEs that have not succeeded in transmitting a PRACH signal that is detected by the network entity may continue to transmit PRACH signals and monitor for response messages from the network entity. After completion of the last RX segment, the UE may transition to the active operating mode to perform the association process 714 with the network entity using the selected power level. Although the various TX and RX segments are shown as occurring continuously, in some implementations, each pair of TX and RX segments may be separated in time by time resources that are allocated to other communications by the network entity, so that the PRACH initialization process 700 is not so long that it blocks other functionality of the network entity. If any UEs have not identified a respective transmitted PRACH signal included in a response message by the end of the Mth RX segment 712, those UEs may wait until a next PRACH initialization time period to continue PRACH signal transmission.

FIG. 8 is a flow diagram illustrating an example process 800 performable by a UE that supports initial PRACH power control using multiple PRACH signals according to one or more aspects of the present disclosure. The operations of the process 800 may be performed by a UE or its components as described herein. For example, the process 800 may be performed by the UE 115 described above with reference to FIGS. 1-4 or a UE described with reference to FIG. 9.

In block 802, the UE transmits, to a network entity, a first plurality of PRACH signals at a plurality of power levels during a time period. Each PRACH signal of the first plurality of PRACH signals being transmitted at a different respective power level of the plurality of power levels. For example, the first plurality of PRACH signals may include or correspond to the PRACH signals 470 of FIG. 4, and the plurality of power levels may include or correspond to the power levels 406 of FIG. 4.

In block 804, the UE receives, from the network entity, a response message indicating a second plurality of PRACH signals detected during the time period. For example, the response message may include or correspond to the response message 474 of FIG. 4. In block 806, the UE transmits, to the network entity, a random access request message at a first power level, of the plurality of power levels, in accordance with the first power level being associated with a first PRACH signal, of the first plurality of PRACH signals, that is included in the second plurality of PRACH signals. For example, the random access request message may include or correspond to the random access request message 476 of FIG. 4.

In some implementations, the process 800 also includes receiving, from the network entity, a PRACH configuration message that indicates one or more resource sets of wireless communication resource blocks. For example, the PRACH configuration message may include or correspond to the PRACH configuration message 480 of FIG. 4, and the one or more resource sets of wireless communication resources may include or correspond to the resource sets 482 of FIG. 4. Each PRACH signal of the first plurality of PRACH signals is transmitted via a different respective wireless communication resource block of the one or more resource sets. For example, transmission of PRACH signals via different wireless communication resource blocks is further described with reference to the transmit opportunities of the one or more resource sets 502 of FIG. 5. In some such implementations, the process 800 further includes randomly or pseudo-randomly selecting, for one or more PRACH signals of the first plurality of PRACH signals, a respective wireless resource block of the one or more resource sets to transmit the PRACH signal. Additionally or alternatively, the process 800 may also include, based on detection of the first PRACH signal being included in the second plurality of PRACH signals, transitioning to a low power operating mode during one or more remaining transmission time segments of a PRACH initialization time period. Different resource sets of the one or more resource sets are associated with different respective transmission time segments of the PRACH initialization time period, and the first plurality of PRACH signals are transmitted during a first transmission time segment. For example, early termination, such as transitioning to the low power operating mode during transmission time segments, is further described above with reference to FIG. 7.

In some implementations, the process 800 also includes selecting, for one or more PRACH signals of the first plurality of PRACH signals, a respective PRACH sequence from a PRACH sequence set according to a fixed pattern. Each PRACH signal of the first plurality of PRACH signals includes a respective PRACH sequence. For example, the PRACH sequences may include or correspond to the PRACH sequences 408 of FIG. 4, which in some implementations are selected according to a fixed pattern. Alternatively, the process 800 may also include randomly or pseudo-randomly selecting, for one or more PRACH signals of the first plurality of PRACH signals, a respective PRACH sequence from the PRACH sequence set.

In some implementations, the process 800 may further include selecting, for one or more PRACH signals of the first plurality of PRACH signals, a respective power level according to a fixed pattern. For example, the power levels 406 of FIG. 4 may be selected according to a fixed pattern, such as a ramp up pattern. Alternatively, the process 800 may include randomly or pseudo-randomly selecting, for one or more PRACH signals of the first plurality of PRACH signals, a respective power level. For example, the power levels 406 of FIG. 4 may be randomly or pseudo-randomly selected.

In some implementations, the response message includes, for each of one or more of the first plurality of PRACH signals, at least a portion of a respective PRACH sequence included in the respective PRACH signal. For example, the respective PRACH sequences may include or correspond to the detected PRACH sequences 462 of FIG. 4. In some such implementations, the response message further includes, for each of one or more of the first plurality of PRACH signals, a respective detected power level, a respective detected delay offset, a respective suggested power offset, or a combination thereof. For example, the detected power levels may include or correspond to the detected power levels 464 of FIG. 4, the detected delay offsets may include or correspond to the delay offsets 466 of FIG. 4, and the suggested power offsets may include or correspond to the suggested power offsets 468 of FIG. 4. In some such implementations, the process 800 may further include determining a path loss based on a power level of the first PRACH signal and a detected power level of the second PRACH signal. The first power level is further in accordance with the path loss. For example, the path loss may include or correspond to the path loss 410 of FIG. 4.

FIG. 9 is a block diagram of an example UE 900 that supports initial PRACH power control using multiple PRACH signals according to one or more aspects of the present disclosure. The UE 900 may be configured to perform operations, including the blocks of the process 800 described with reference to FIG. 8. In some implementations, the UE 900 includes the structure, hardware, and components shown and described with reference to the UE 115 of FIGS. 1-4. For example, the UE 900 includes the controller 280, which operates to execute logic or computer instructions stored in the memory 282, as well as controlling the components of the UE 900 that provide the features and functionality of the UE 900. The UE 900, under control of the controller 280, transmits and receives signals via the wireless radios 901a-r and the antennas 252a-r. The wireless radios 901a-r include various components and hardware, as illustrated in FIG. 2 for the UE 115, including the modulator and demodulators 254a-r, the MIMO detector 256, the receive processor 258, the transmit processor 264, and the TX MIMO processor 266.

As shown, the memory 282 may include (or be configured to store) PRACH initialization logic 902, power levels 903, transmit (TX) power control logic 904, and communication logic 905. The PRACH initialization logic 902 may be configured to generate PRACH signaling to be transmitted during initialization and power control operations. The power levels 903 may include or correspond to the power levels 406 of FIG. 4. The TX power control logic 904 may be configured to select and set power levels of transmissions, such as PRACH signals and messages during an association process. The communication logic 905 may be configured to enable communication between the UE 900 and one or more other devices. The UE 900 may receive signals from or transmit signals to one or more network entities, such as the base station 105 of FIGS. 1-3, the network entity 450 of FIG. 4, or a network entity as illustrated in FIG. 11.

FIG. 10 is a flow diagram illustrating an example process 1000 performable by a network entity that supports initial PRACH power control using multiple PRACH signals according to one or more aspects of the present disclosure. Operations of the process 1000 may be performed by a network entity or its components, such as a base station or other network entity, as described herein. For example, the process 1000 may be performed by the base station 105 described above with reference to FIGS. 1-3, the network entity 450 described above with reference to FIG. 4, or a network entity as described above with reference to FIG. 11.

At block 1002, the network entity detects a first plurality of PRACH signals transmitted by one or more UEs during a time period. For example, the first plurality of PRACH signals may include or correspond to PRACH signals detected at the network entity 450 of FIG. 4, which may be a subset of the PRACH signals 470 and the PRACH signals 472. At block 1004, the network entity transmits, to the one or more UEs, a response message indicating the first plurality of PRACH signals. For example, the response message may include or correspond to the response message 474 of FIG. 4.

At block 1006, the network entity receives, from a first UE of the one or more UEs, a random access request message at a first power level in accordance with a first PRACH signal, of the first plurality of PRACH signals, being included in a second plurality of PRACH signals transmitted by the first UE during the time period. For example, the random access request message may include or correspond to the random access request message 476 of FIG. 4, and the first power level may include or correspond to one of the power levels 406 of FIG. 4.

In some implementations, the process 1000 further includes receiving, from a second UE of the one or more UEs, a second random access request message at a second power level in accordance with a third PRACH signal, of the first plurality of PRACH signals, being included in a third plurality of PRACH signals transmitted by the second UE during the time period. For example, the second UE may include or correspond to the UE 430 of FIG. 4, and the fourth PRACH signal may include or correspond to one of the PRACH signals 472 of FIG. 4.

In some implementations, the response message includes, for one or more of the first plurality of PRACH signals, at least a portion of a respective PRACH sequence included in the first PRACH signal. For example, the PRACH sequences may include or correspond to the detected PRACH sequences 462. In some such implementations, the response message further includes, for one or more of the first plurality of PRACH signals, a respective detected power level, a respective detected delay offset, a respective suggested power offset, or a combination thereof. For example, the detected power levels may include or correspond to the detected power levels 464 of FIG. 4, the detected delay offsets may include or correspond to the delay offsets 466, and the suggested power offsets may include or correspond to the suggested power offsets 468 of FIG. 4.

FIG. 11 is a block diagram of an example network entity 1100 that supports initial PRACH power control using multiple PRACH signals according to one or more aspects. The network entity 1100 may be configured to perform operations, including the blocks of process 1000 described with reference to FIG. 10. In some implementations, the network entity 1100 includes the structure, hardware, and components shown and described with reference to base station 105 of FIGS. 1-3, or the network entity 450 of FIG. 4. For example, the network entity 1100 may include the controller 240, which operates to execute logic or computer instructions stored in the memory 242, as well as controlling the components of the network entity 1100 that provide the features and functionality of the network entity 1100. The network entity 1100, under control of the controller 240, transmits and receives signals via the wireless radios 1101*a-t* and the antennas 234*a-t*. The wireless radios 1101*a-t* include various components and hardware, as illustrated in FIG. 2 for the base station 105, including the modulator and demodulators the 232*a-t*, the transmit processor 220, the TX MIMO processor 230, the MIMO detector 236, and the receive processor 238.

As shown, the memory 242 may include (or be configured to store) PRACH initialization logic 1102, detected sequences 1103, and communication logic 1104. The PRACH initialization logic 1102 may be configured to detect PRACH signals from UEs and enable transmission of a response message that indicates the detected PRACH signals. The detected sequences 1103 may include or correspond to the detected PRACH sequences 462 of FIG. 4. The communication logic 1104 may be configured to enable communication between network entity 1100 and one or more other devices. The network entity 1100 may receive signals from or transmit signals to one or more UEs, such as the UE 115 of FIGS. 1-4 or the UE 900 of FIG. 9.

It is noted that one or more blocks (or operations) described with reference to FIGS. 8 and 10 may be combined with one or more blocks (or operations) described with reference to another of the figures. For example, one or more blocks (or operations) of FIG. 8 may be combined with one or more blocks (or operations) of FIG. 10. As another example, one or more blocks associated with FIG. 8 or 10 may be combined with one or more blocks (or operations) associated with FIGS. 1-7. Additionally, or alternatively, one or more operations described above with reference to FIGS. 1-7 may be combined with one or more operations described with reference to FIG. 9 or 11.

In one or more aspects, techniques for supporting initial PRACH power control using multiple PRACH signals may include additional aspects, such as any single aspect or any combination of aspects described below or in connection with one or more other processes or devices described elsewhere herein. In some examples, the techniques one or more aspects may be implemented in a method or process. In some other examples, the techniques of one or more aspects may be implemented in a wireless communication device, such as a UE or a component of a UE. In some examples, the wireless communication device may include at least one processing unit or system (which may include an application processor, a modem or other components) and at least one memory device coupled to the processing unit. The processing unit or system may be configured to perform operations described herein with respect to the wireless communication device. In some examples, the memory device includes a non-transitory, computer-readable medium storing instructions or having program code stored thereon that, when executed by the processing unit or system, is configured to cause the wireless communication device to perform the operations described herein. Additionally, or alternatively, the wireless communication device may include an interface (e.g., a wireless communication interface) that includes a transmitter, a receiver, or a combination thereof. Additionally, or alternatively, the wireless communication device may include one or more means configured to perform operations described herein. In some other examples, the techniques of one or more aspects may be implemented in a network entity, such as a base station, a component of a base station, a server, a component of a server, another network entity, or a component of another network entity. In some examples, the network entity may include at least one processing unit or system (which may include an application processor, a modem or other components) and at least one memory device coupled to the processing unit. The processing unit or system may be configured to perform operations described herein with respect to the wireless communication device. In some examples, the memory device includes a non-transitory, computer-readable medium storing instructions or having program code stored thereon that, when executed by the processing unit or system, is configured to cause the network entity to perform the operations described herein. Additionally, or alternatively, the network entity may include an interface (e.g., a wireless communication interface) that includes a transmitter, a receiver, or a combination thereof. Additionally, or alternatively, the network entity may include one or more means configured to perform operations described herein.

Implementation examples are described in the following numbered clauses:

Clause 1: A UE including a processing system that includes processor circuitry and memory circuitry that stores code, the processing system configured to cause the UE to: transmit, to a network entity, a first plurality of PRACH signals at a plurality of power levels during a time period, each PRACH signal of the first plurality of PRACH signals being transmitted at a different respective power level of the plurality of power levels; receive, from the network entity, a response message indicating a second plurality of PRACH signals detected during the time period; and transmit, to the network entity, a random access request message at a first power level, of the plurality of power levels, in accordance with the first power level being associated with a first PRACH signal, of the first plurality of PRACH signals, that is included in the second plurality of PRACH signals.

Clause 2: The UE of clause 1, where the processing system is further configured to cause the UE to: receive, from the network entity, a PRACH configuration message that indicates one or more resource sets of wireless communication resource blocks, where each PRACH signal of the first plurality of PRACH signals is transmitted via a different respective wireless communication resource block of the one or more resource sets.

Clause 3: The UE of clause 2, where the processing system is further configured to cause the UE to: randomly or pseudo-randomly select, for one or more PRACH signals of the first plurality of PRACH signals, a respective wireless resource block of the one or more resource sets to transmit the PRACH signal.

Clause 4: The UE of clause 2, where different resource sets of the one or more resource sets are associated with different respective transmission time segments of a PRACH initialization time period, where the first plurality of PRACH signals are transmitted during a first transmission time segment, and where the processing system is further configured to cause the UE to: based on detection of the first PRACH signal being included in the second plurality of PRACH signals, transition to a low power operating mode during one or more remaining transmission time segments of the PRACH initialization time period.

Clause 5: The UE of clause 1, where each PRACH signal of the first plurality of PRACH signals includes a respective PRACH sequence, and where the processing system is further configured to cause the UE to: select, for one or more PRACH signals of the first plurality of PRACH signals, a respective PRACH sequence from a PRACH sequence set according to a fixed pattern.

Clause 6: The UE of clause 1, where each PRACH signal of the first plurality of PRACH signals includes a respective PRACH sequence, and where the processing system is further configured to cause the UE to: randomly or pseudo-randomly select, for one or more PRACH signals of the first plurality of PRACH signals, a respective PRACH sequence from a PRACH sequence set.

Clause 7: The UE of clause 1, where the processing system is further configured to cause the UE to: select, for one or more PRACH signals of the first plurality of PRACH signals, a respective power level according to a fixed pattern.

Clause 8: The UE of clause 1, where the processing system is further configured to cause the UE to: randomly or pseudo-randomly select, for one or more PRACH signals of the first plurality of PRACH signals, a respective power level.

Clause 9: The UE of clause 1, where the response message includes, for each of one or more of the second plurality of PRACH signals, at least a portion of a respective PRACH sequence included in the respective PRACH signal.

Clause 10: The UE of clause 9, where the response message further includes, for each of one or more of the second plurality of PRACH signals, a respective detected power level, a respective detected delay offset, a respective suggested power offset, or a combination thereof.

Clause 11: The UE of clause 10: where, the processing system is further configured to cause the UE to: determine a path loss based on a power level of the first PRACH signal and a detected power level of the second PRACH signal, where the first power level is further in accordance with the path loss.

Clause 12: A method for wireless communication by a UE, the method including: transmitting, to a network entity, a first plurality of PRACH signals at a plurality of power levels during a time period, each PRACH signal of the first plurality of PRACH signals being transmitted at a different respective power level of the plurality of power levels; receiving, from the network entity, a response message indicating a second plurality of PRACH signals detected during the time period; and transmitting, to the network entity, a random access request message at a first power level, of the plurality of power levels, in accordance with the first power level being associated with a first PRACH signal, of the first plurality of PRACH signals, that is included in the second plurality of PRACH signals.

Clause 13: The method of clause 12, further including: receiving, from the network entity, a PRACH configuration message that indicates one or more resource sets of wireless communication resource blocks, where each PRACH signal of the first plurality of PRACH signals is transmitted via a different respective wireless communication resource block of the one or more resource sets.

Clause 14: The method of clause 13, further including: randomly or pseudo-randomly selecting, for one or more PRACH signals of the first plurality of PRACH signals, a respective wireless resource block of the one or more resource sets to transmit the PRACH signal.

Clause 15: The method of clause 13, where different resource sets of the one or more resource sets are associated with different respective transmission time segments of a PRACH initialization time period, where the first plurality of PRACH signals are transmitted during a first transmission time segment, and further including: based on detection of the first PRACH signal being included in the second plurality of PRACH signals, transitioning to a low power operating mode during one or more remaining transmission time segments of the PRACH initialization time period.

Clause 16: The method of clause 12, further including: selecting, for one or more PRACH signals of the first plurality of PRACH signals, a respective PRACH sequence from a PRACH sequence set according to a fixed pattern, where each PRACH signal of the first plurality of PRACH signals includes a respective PRACH sequence.

Clause 17: The method of clause 12, further including: randomly or pseudo-randomly selecting, for one or more PRACH signals of the first plurality of PRACH signals, a respective PRACH sequence from a PRACH sequence set, where each PRACH signal of the first plurality of PRACH signals includes a respective PRACH sequence.

Clause 18: The method of clause 12, further including: selecting, for one or more PRACH signals of the first plurality of PRACH signals, a respective power level according to a fixed pattern.

Clause 19: The method of clause 12, further including: randomly or pseudo-randomly selecting, for one or more PRACH signals of the first plurality of PRACH signals, a respective power level.

Clause 20: The method of clause 12, where the response message includes, for each of one or more of the first plurality of PRACH signals, at least a portion of a respective PRACH sequence included in the respective PRACH signal.

Clause 21: The method of clause 20, where the response message further includes, for each of one or more of the first plurality of PRACH signals, a respective detected power level, a respective detected delay offset, a respective suggested power offset, or a combination thereof.

Clause 22: The method of clause 21, further including: determining a path loss based on a power level of the first PRACH signal and a detected power level of the second PRACH signal, where the first power level is further in accordance with the path loss.

Clause 23: A network entity including a processing system that includes processor circuitry and memory circuitry that stores code, the processing system configured to cause the network entity to: detect a first plurality of PRACH signals transmitted by one or more UEs during a time period; transmit, to the one or more UEs, a response message indicating the first plurality of PRACH signals; and receive, from a first UE of the one or more UEs, a random access request message at a first power level in accordance with a first PRACH signal, of the first plurality of PRACH signals, being included in a second plurality of PRACH signals transmitted by the first UE during the time period.

Clause 24: The network entity of clause 23, where the processing system is further configured to cause the network entity to: receive, from a second UE of the one or more UEs, a second random access request message at a second power level in accordance with a third PRACH signal, of the first plurality of PRACH signals, being included in a third plurality of PRACH signals transmitted by the second UE during the time period.

Clause 25: The network entity of clause 23, where the response message includes, for one or more of the first plurality of PRACH signals, at least a portion of a respective PRACH sequence included in the first PRACH signal.

Clause 26: The network entity of clause 25, where the response message further includes, for one or more of the first plurality of PRACH signals, a respective detected power level, a respective detected delay offset, a respective suggested power offset, or a combination thereof.

Clause 27: A method for wireless communication by a network entity, including: detecting a first plurality of PRACH signals transmitted by one or more UEs during a time period; transmitting, to the one or more UEs, a response message indicating the first plurality of PRACH signals; and receiving, from a first UE of the one or more UEs, a random access request message at a first power level in accordance with a first PRACH signal, of the first plurality of PRACH signals, being included in a second plurality of PRACH signals transmitted by the first UE during the time period.

Clause 28: The method of clause 27, further including: receiving, from a second UE of the one or more UEs, a second random access request message at a second power level in accordance with a third PRACH signal, of the first plurality of PRACH signals, being included in a third plurality of PRACH signals transmitted by the second UE during the time period.

Clause 29: The method of clause 27, where the response message includes, for one or more of the first plurality of PRACH signals, at least a portion of a respective PRACH sequence included in the first PRACH signal.

Clause 30: The method of clause 29, where the response message further includes, for one or more of the first plurality of PRACH signals, a respective detected power level, a respective detected delay offset, a respective suggested power offset, or a combination thereof.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-11 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, some other implementations are within the scope of the following claims. In some cases, the actions recited in the claims can be performed in a different order and still achieve desirable results.

As used herein, including in the claims, the term "or," when used in a list of two or more items, means that any one of the listed items can be employed by itself, or any combination of two or more of the listed items can be employed. For example, if a composition is described as containing components A. B. or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

As used herein, "based on" is intended to be interpreted in the inclusive sense, unless otherwise explicitly indicated. For example, "based on" may be used interchangeably with "based at least in part on," "associated with", "in association with", or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions or information. Additionally, an operation a that is performed "in association with" a condition b may be performed based on or in association with the existence of condition b, responsive to condition b, in response to condition b, or otherwise due to an association or correspondence between the operation a and the condition b.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A user equipment (UE), comprising:
a processing system that includes processor circuitry and memory circuitry that stores code, the processing system configured to cause the UE to:
transmit, to a network entity, a first plurality of physical random access channel (PRACH) signals at a plurality of power levels during a time period, each PRACH signal of the first plurality of PRACH signals being transmitted at a different respective power level of the plurality of power levels;
receive, from the network entity, a response message indicating a second plurality of PRACH signals detected during the time period; and
transmit, to the network entity, a random access request message at a first power level, of the plurality of power levels, in accordance with the first power level being associated with a first PRACH signal, of the first plurality of PRACH signals, that is included in the second plurality of PRACH signals.

2. The UE of claim 1, wherein the processing system is further configured to cause the UE to:
receive, from the network entity, a PRACH configuration message that indicates one or more resource sets of wireless communication resource blocks, wherein each PRACH signal of the first plurality of PRACH signals is transmitted via a different respective wireless communication resource block of the one or more resource sets.

3. The UE of claim 2, wherein the processing system is further configured to cause the UE to:
randomly or pseudo-randomly select, for one or more PRACH signals of the first plurality of PRACH signals, a respective wireless resource block of the one or more resource sets to transmit the PRACH signal.

4. The UE of claim 2, wherein different resource sets of the one or more resource sets are associated with different respective transmission time segments of a PRACH initialization time period, wherein the first plurality of PRACH signals are transmitted during a first transmission time segment, and wherein the processing system is further configured to cause the UE to:
based on detection of the first PRACH signal being included in the second plurality of PRACH signals, transition to a low power operating mode during one or more remaining transmission time segments of the PRACH initialization time period.

5. The UE of claim 1, wherein each PRACH signal of the first plurality of PRACH signals includes a respective PRACH sequence, and wherein the processing system is further configured to cause the UE to:
select, for one or more PRACH signals of the first plurality of PRACH signals, a respective PRACH sequence from a PRACH sequence set according to a fixed pattern.

6. The UE of claim 1, wherein each PRACH signal of the first plurality of PRACH signals includes a respective PRACH sequence, and wherein the processing system is further configured to cause the UE to:
randomly or pseudo-randomly select, for one or more PRACH signals of the first plurality of PRACH signals, a respective PRACH sequence from a PRACH sequence set.

7. The UE of claim 1, wherein the processing system is further configured to cause the UE to:
select, for one or more PRACH signals of the first plurality of PRACH signals, a respective power level according to a fixed pattern.

8. The UE of claim 1, wherein the processing system is further configured to cause the UE to:
randomly or pseudo-randomly select, for one or more PRACH signals of the first plurality of PRACH signals, a respective power level.

9. The UE of claim 1, wherein the response message includes, for each of one or more of the second plurality of PRACH signals, at least a portion of a respective PRACH sequence included in the respective PRACH signal.

10. The UE of claim 9, wherein the response message further includes, for each of one or more of the second plurality of PRACH signals, a respective detected power level, a respective detected delay offset, a respective suggested power offset, or a combination thereof.

11. The UE of claim 10, wherein the processing system is further configured to cause the UE to:
determine a path loss based on a power level of the first PRACH signal and a detected power level of the second PRACH signal, wherein the first power level is further in accordance with the path loss.

12. A method for wireless communication by a user equipment (UE), comprising:
transmitting, to a network entity, a first plurality of physical random access channel (PRACH) signals at a plurality of power levels during a time period, each PRACH signal of the first plurality of PRACH signals being transmitted at a different respective power level of the plurality of power levels;
receiving, from the network entity, a response message indicating a second plurality of PRACH signals detected during the time period; and
transmitting, to the network entity, a random access request message at a first power level, of the plurality of power levels, in accordance with the first power level being associated with a first PRACH signal, of the first plurality of PRACH signals, that is included in the second plurality of PRACH signals.

13. The method of claim 12, further comprising:
receiving, from the network entity, a PRACH configuration message that indicates one or more resource sets of wireless communication resource blocks, wherein each PRACH signal of the first plurality of PRACH signals is transmitted via a different respective wireless communication resource block of the one or more resource sets.

14. The method of claim 13, further comprising:
randomly or pseudo-randomly selecting, for one or more PRACH signals of the first plurality of PRACH signals, a respective wireless resource block of the one or more resource sets to transmit the PRACH signal.

15. The method of claim 13, wherein different resource sets of the one or more resource sets are associated with different respective transmission time segments of a PRACH initialization time period, wherein the first plurality of PRACH signals are transmitted during a first transmission time segment, and further comprising:
based on detection of the first PRACH signal being included in the second plurality of PRACH signals, transitioning to a low power operating mode during one or more remaining transmission time segments of the PRACH initialization time period.

16. The method of claim 12, further comprising:
selecting, for one or more PRACH signals of the first plurality of PRACH signals, a respective PRACH sequence from a PRACH sequence set according to a fixed pattern, wherein each PRACH signal of the first plurality of PRACH signals includes a respective PRACH sequence.

17. The method of claim 12, further comprising:
randomly or pseudo-randomly selecting, for one or more PRACH signals of the first plurality of PRACH signals, a respective PRACH sequence from a PRACH sequence set, wherein each PRACH signal of the first plurality of PRACH signals includes a respective PRACH sequence.

18. The method of claim 12, further comprising:
selecting, for one or more PRACH signals of the first plurality of PRACH signals, a respective power level according to a fixed pattern.

19. The method of claim 12, further comprising:
randomly or pseudo-randomly selecting, for one or more PRACH signals of the first plurality of PRACH signals, a respective power level.

20. The method of claim 12, wherein the response message includes, for each of one or more of the first plurality of PRACH signals, at least a portion of a respective PRACH sequence included in the respective PRACH signal.

21. The method of claim 20, wherein the response message further includes, for each of one or more of the first plurality of PRACH signals, a respective detected power level, a respective detected delay offset, a respective suggested power offset, or a combination thereof.

22. The method of claim 21, further comprising:
determining a path loss based on a power level of the first PRACH signal and a detected power level of the second PRACH signal, wherein the first power level is further in accordance with the path loss.

23. A network entity, comprising:
a processing system that includes processor circuitry and memory circuitry that stores code, the processing system configured to cause the network entity to:
detect a first plurality of physical random access channel (PRACH) signals transmitted by one or more user equipments (UEs) during a time period;
transmit, to the one or more UEs, a response message indicating the first plurality of PRACH signals; and
receive, from a first UE of the one or more UEs, a random access request message at a first power level in accordance with a first PRACH signal, of the first plurality of PRACH signals, being included in a second plurality of PRACH signals transmitted by the first UE during the time period.

24. The network entity of claim 23, wherein the processing system is further configured to cause the network entity to:
receive, from a second UE of the one or more UEs, a second random access request message at a second power level in accordance with a third PRACH signal, of the first plurality of PRACH signals, being included in a third plurality of PRACH signals transmitted by the second UE during the time period.

25. The network entity of claim 23, wherein the response message includes, for one or more of the first plurality of PRACH signals, at least a portion of a respective PRACH sequence included in the first PRACH signal.

26. The network entity of claim 25, wherein the response message further includes, for one or more of the first plurality of PRACH signals, a respective detected power level, a respective detected delay offset, a respective suggested power offset, or a combination thereof.

27. A method for wireless communication by a network entity, comprising:
detecting a first plurality of physical random access channel (PRACH) signals transmitted by one or more user equipments (UEs) during a time period;
transmitting, to the one or more UEs, a response message indicating the first plurality of PRACH signals; and
receiving, from a first UE of the one or more UEs, a random access request message at a first power level in accordance with a first PRACH signal, of the first plurality of PRACH signals, being included in a second plurality of PRACH signals transmitted by the first UE during the time period.

28. The method of claim 27, further comprising:
receiving, from a second UE of the one or more UEs, a second random access request message at a second power level in association with a third PRACH signal, of the first plurality of PRACH signals, being included in a third plurality of PRACH signals transmitted by the second UE during the time period.

29. The method of claim 27, wherein the response message includes, for one or more of the first plurality of PRACH signals, at least a portion of a respective PRACH sequence included in the first PRACH signal.

30. The method of claim 29, wherein the response message further includes, for one or more of the first plurality of PRACH signals, a respective detected power level, a respective detected delay offset, a respective suggested power offset, or a combination thereof.

* * * * *